(12) United States Patent
Yerramalli et al.

(10) Patent No.: US 10,716,120 B2
(45) Date of Patent: Jul. 14, 2020

(54) CHANNEL ACCESS MECHANISMS FOR MULTI-BAND OPERATION

(71) Applicant: QUALCOMM Incorporated, San Diego, CA (US)

(72) Inventors: Srinivas Yerramalli, San Diego, CA (US); Rahul Malik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/107,290

(22) Filed: Aug. 21, 2018

(65) Prior Publication Data

US 2019/0069303 A1 Feb. 28, 2019

Related U.S. Application Data

(60) Provisional application No. 62/550,392, filed on Aug. 25, 2017.

(51) Int. Cl.
*H04W 72/08* (2009.01)
*H04W 72/04* (2009.01)
(Continued)

(52) U.S. Cl.
CPC ..... *H04W 72/082* (2013.01); *H04W 72/0413* (2013.01); *H04W 72/0446* (2013.01);
(Continued)

(58) Field of Classification Search
CPC ............. H04W 16/14; H04W 28/0231; H04W 28/0236; H04W 72/04; H04W 72/0413;
(Continued)

(56) References Cited

U.S. PATENT DOCUMENTS

| 8,676,221 B2* | 3/2014 | Nagaraja | H04L 5/0007 |
| | | | 455/446 |
| 9,007,968 B2* | 4/2015 | Singh | H04W 72/044 |
| | | | 370/310 |

(Continued)

FOREIGN PATENT DOCUMENTS

WO WO-2017133621 A1 8/2017

OTHER PUBLICATIONS

International Search Report and Written Opinion—PCT/US2018/047557—ISA/EPO—dated Nov. 29, 2018.

*Primary Examiner* — Tri H Phan
(74) *Attorney, Agent, or Firm* — Holland & Hart LLP

(57) ABSTRACT

Methods, systems, and devices for wireless communication are described. Some wireless communications systems may support multi-band operation. Different frequency bands may experience different communication characteristics (e.g., frequency-dependent fading), which may result in undesirable interference patterns and/or coverage gaps. The described techniques provide for channel access methods for multi-band operation. The channel access methods may allow for improved throughput for a wireless communications system. Additionally or alternatively, the described techniques may improve energy efficiency for communicating devices, reduce signaling overhead, or otherwise benefit a wireless communications system. Generally, the described techniques provide for efficient anchoring of high-band communications to low-band transmissions.

30 Claims, 20 Drawing Sheets

(51) Int. Cl.
*H04W 74/00* (2009.01)
*H04W 74/08* (2009.01)
*H04W 16/14* (2009.01)

(52) U.S. Cl.
CPC ....... *H04W 74/002* (2013.01); *H04W 74/004* (2013.01); *H04W 16/14* (2013.01); *H04W 72/0453* (2013.01); *H04W 74/0808* (2013.01)

(58) Field of Classification Search
CPC .......... H04W 72/042; H04W 72/0446; H04W 72/0453; H04W 72/08; H04W 72/082; H04W 72/085; H04W 72/087; H04W 72/1226; H04W 72/1231; H04W 74/00; H04W 74/004; H04W 74/002; H04W 74/0808; H04W 88/06; H04W 88/10
See application file for complete search history.

(56) References Cited

U.S. PATENT DOCUMENTS

| | | | |
|---|---|---|---|
| 9,439,099 B2* | 9/2016 | Emmanuel | H04W 28/0215 |
| 10,154,502 B2* | 12/2018 | Shapira | H04W 72/082 |
| 10,257,778 B2* | 4/2019 | Ode | H04W 48/12 |
| 10,321,484 B2* | 6/2019 | Lou | H04W 74/0816 |
| 10,397,976 B2* | 8/2019 | Malik | H04W 24/02 |
| 10,555,298 B2* | 2/2020 | Ode | H04W 48/10 |
| 2009/0111477 A1* | 4/2009 | Tsutsui | H04L 1/1887 |
| | | | 455/450 |
| 2013/0235746 A1* | 9/2013 | Patel | H04W 72/0453 |
| | | | 370/252 |
| 2014/0050146 A1 | 2/2014 | Chrisikos et al. | |
| 2018/0054821 A1 | 2/2018 | Sun et al. | |
| 2018/0191421 A1* | 7/2018 | Seo | H04B 7/0691 |
| 2019/0069228 A1* | 2/2019 | Malik | H04L 5/0048 |

* cited by examiner

CHANNEL ACCESS MECHANISMS FOR MULTI-BAND OPERATION

CROSS REFERENCES

The present application for patent claims the benefit of U.S. Provisional Patent Application No. 62/550,392 by Yerramalli, et al., entitled "CHANNEL ACCESS MECHANISMS FOR MULTI-BAND OPERATION," filed Aug. 25, 2017, assigned to the assignee hereof, and expressly incorporated by reference herein.

BACKGROUND

The following relates generally to wireless communication, and more specifically to channel access mechanisms for multi-band operation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In wireless communications systems supporting communications over multiple frequency bands, higher frequencies may generally experience larger degrees of signal attenuation. For example, millimeter wave (mmW) communications may experience substantially lower coverage in non-line-of-sight (NLOS) channels (e.g., compared to sub-6 GHz communications). Additionally, mmW deployments may provide sparser coverage (e.g., larger or more regular coverage gaps) than low-band deployments. In some cases, unlicensed mmW communications may be associated with stricter effective isotropic radiated power (EIRP) regulations than licensed or shared spectrum communications. For example, the 60 GHz unlicensed band may limit transmission power to 40 dBm per device while the 37 GHz shared band may allow transmission powers up to 75 dBm per 100 MHz per device. Additionally or alternatively, maximum permissible exposure (MPE) restrictions may limit the achievable data rate and/or communication coverage at certain high-band (e.g., mmW) frequencies (e.g., for both unlicensed and licensed channels).

Power consumption in mmW devices may be dominated by the radio frequency (RF) components, which may dissipate power due to lower efficiencies associated with operation at higher frequencies. Additionally, stand-alone cellular design approaches may be ineffective for mmW deployments (e.g., due to the low achievable inter-site distances (ISDs) which may create signal interference for communications over frequencies that experience lower degrees of signal attenuation). Therefore, while communications over higher frequency bands may experience benefits (e.g., greater bandwidth), such benefits may in some cases be offset by the resource cost. Improved techniques that support multi-band operation may be desired.

SUMMARY

The described techniques relate to improved methods, systems, devices, or apparatuses that support channel access mechanisms for multi-band operation. Generally, the described techniques provide for enhanced channel access using multiple communication links across multiple frequency bands. Various channel access mechanisms supporting multi-band operation are considered. In accordance with the described techniques, transmissions over one or more communication links of a higher frequency band (e.g., mmW band) may be anchored to transmissions on a lower frequency band (e.g., sub-6 GHz band). Various relationships between high-band communication links and low-band communication links are considered below. For example, the described techniques may provide for synchronous or asynchronous operation across the frequency bands. In some cases, the operation may depend upon a device's ability to viably connect an uplink on the high frequency band. For example, the device may determine whether an uplink on the high band can be viably connected (e.g., based on transmission power restrictions) and communicate over the high-band and the low-band accordingly. For example, if it is determined that the uplink on the high-band cannot be viably connected, the device may receive downlink transmissions over both frequency bands but may only transmit uplink control information over the low-band. Other examples are discussed below. Such techniques may improve communication coverage, reduce signaling overhead, or otherwise benefit a wireless communications system.

A method of wireless communication is described. The method may be performed by a wireless device having a first radio supporting communications via a first frequency band and a second radio supporting communications via a second frequency band. The method may include receiving, via a first communication link in the first frequency band, a configuration for a second communication link in the second frequency band, determining whether an uplink for the second communication link can be viably connected, activating the second radio based at least in part on the configuration, receiving, via the second radio, a downlink transmission over the second communication link, and transmitting uplink control information for the downlink transmission over the first communication link or over the second communication link based at least in part on the determining whether the uplink for the second communication link can be viably connected.

An apparatus for wireless communication is described. The apparatus may include means for receiving, via a first communication link in the first frequency band, a configuration for a second communication link in the second frequency band, means for determining whether an uplink for the second communication link can be viably connected, means for activating the second radio based at least in part on the configuration, means for receiving, via the second radio, a downlink transmission over the second communication link, and means for transmitting uplink control information for the downlink transmission over the first communication link or over the second communication link based at least in part on the determining whether the uplink for the second communication link can be viably connected.

Another apparatus for wireless communication is described. The apparatus may include a processor, memory in electronic communication with the processor, and instructions stored in the memory. The instructions may be operable to cause the processor to receive, via a first communication link in the first frequency band, a configuration for a second communication link in the second frequency band, determine whether an uplink for the second communication link can be viably connected, receive, via the first radio, a preceding downlink transmission over the first communication link, activate the second radio based at least in part on the configuration, receive, via the second radio, a downlink transmission over the second communication link, and transmit uplink control information for the downlink transmission over the first communication link or over the second communication link based at least in part on the determining whether the uplink for the second communication link can be viably connected.

A non-transitory computer readable medium for wireless communication is described. The non-transitory computer-readable medium may include instructions operable to cause a processor to receive, via a first communication link in the first frequency band, a configuration for a second communication link in the second frequency band, determine whether an uplink for the second communication link can be viably connected, receive, via the first radio, a preceding downlink transmission over the first communication link, activate the second radio based at least in part on the configuration, receive, via the second radio, a downlink transmission over the second communication link, and transmit uplink control information for the downlink transmission over the first communication link or over the second communication link based at least in part on the determining whether the uplink for the second communication link can be viably connected.

Some examples of the method, apparatus, and non-transitory computer-readable medium described above may further include processes, features, means, or instructions for identifying a timing offset between the preceding downlink transmission and the downlink transmission based at least in part on the configuration, wherein the activating the second radio for the downlink transmission may be based at least in part on the timing offset.

In some examples of the method, apparatus, and non-transitory computer-readable medium described above, determining whether the uplink for the second communication link can be viably connected comprises determining that the uplink for the second communication link cannot establish a viable connection. Some examples of the method, apparatus, and non-transitory computer-readable medium described above may further include processes, features, means, or instructions for transmitting, to a base station associated with the first communication link, the uplink control information for the downlink transmission over the first communication link.

In some examples of the method, apparatus, and non-transitory computer-readable medium described above, the downlink transmission starts prior to completion of a channel access procedure for a first frequency channel associated with the preceding downlink transmission.

In some examples of the method, apparatus, and non-transitory computer-readable medium described above, the preceding downlink transmission comprises downlink control information indicating resources of the downlink transmission associated with a transport block for the UE.

In some examples of the method, apparatus, and non-transitory computer-readable medium described above, the configuration comprises a set of HARQ processes for the second communication link, the downlink transmission being associated with one of the set of HARQ processes.

In some examples of the method, apparatus, and non-transitory computer-readable medium described above, the determining whether the uplink for the second communication link can be viably connected may be based at least in part on a link budget for the uplink for the second communication link, a power consumption cost for the UE of the uplink for the second communication link, a MPE for the uplink for the second communication link, or any combination thereof.

In some examples of the method, apparatus, and non-transitory computer-readable medium described above, the determining whether the uplink for the second communication link can be viably connected comprises determining that the uplink for the second communication link can be viably connected. Some examples of the method, apparatus, and non-transitory computer-readable medium described above may further include processes, features, means, or instructions for transmitting, via the second radio, the uplink control information for the downlink transmission over the uplink for the second communication link.

In some examples of the method, apparatus, and non-transitory computer-readable medium described above, the uplink control information comprises acknowledgement information, link management information, beam management information, or any combination thereof.

In some examples of the method, apparatus, and non-transitory computer-readable medium described above, the preceding downlink transmission and the downlink transmission may be received from respective antenna arrays of a same base station.

In some examples of the method, apparatus, and non-transitory computer-readable medium described above, the preceding downlink transmission may be received from a first base station and the downlink transmission may be received from a second base station.

In some examples of the method, apparatus, and non-transitory computer-readable medium described above, the first communication link may be established over a licensed channel in the first frequency band and the second communication link may be established over an unlicensed frequency channel in the second frequency band or a shared-spectrum channel in the second frequency band.

Some examples of the method, apparatus, and non-transitory computer-readable medium described above may further include processes, features, means, or instructions for receiving, from a base station, a RRQ over the first communication link, wherein the RRQ indicates reservation of a first frequency channel for use by the first communication link. Some examples of the method, apparatus, and non-transitory computer-readable medium described above may further include processes, features, means, or instructions for transmitting, to the base station, a RRS over the first communication link, wherein the preceding downlink transmission may be received from the base station based at least in part on the RRS.

In some examples of the method, apparatus, and non-transitory computer-readable medium described above, the RRQ indicates a set of UEs to be scheduled on the second communication link, the set of UEs comprising the UE.

In some examples of the method, apparatus, and non-transitory computer-readable medium described above, the RRQ indicates a timing offset between the preceding downlink transmission and the downlink transmission, and wherein the activating the second radio for the downlink transmission may be based at least in part on the timing offset.

In some examples of the method, apparatus, and non-transitory computer-readable medium described above, the RRS indicates whether the UE can viably connect the uplink for the second communication link.

A method of wireless communication is described. The method may include determining, based at least in part on a first channel access procedure, that a first frequency channel of a first frequency band is available for use by a first communication link to a UE, transmitting a preceding downlink transmission via the first communication link to the UE, the preceding downlink transmission activating a second communication link over a second frequency channel of a second frequency band, receiving an indication from the UE that indicates whether the UE can viably connect an uplink for the second communication link, transmitting a downlink transmission over the second communication link, and receiving uplink control information for the downlink transmission over an uplink for the first communication link or the uplink for the second communication link based at least in part on the indication.

An apparatus for wireless communication is described. The apparatus may include means for determining, based at least in part on a first channel access procedure, that a first frequency channel of a first frequency band is available for use by a first communication link to a UE, means for transmitting a preceding downlink transmission via the first communication link to the UE, the preceding downlink transmission activating a second communication link over a second frequency channel of a second frequency band, means for receiving an indication from the UE that indicates whether the UE can viably connect an uplink for the second communication link, means for transmitting a downlink transmission over the second communication link, and means for receiving uplink control information for the downlink transmission over an uplink for the first communication link or the uplink for the second communication link based at least in part on the indication.

Another apparatus for wireless communication is described. The apparatus may include a processor, memory in electronic communication with the processor, and instructions stored in the memory. The instructions may be operable to cause the processor to determine, based at least in part on a first channel access procedure, that a first frequency channel of a first frequency band is available for use by a first communication link to a UE, transmit a preceding downlink transmission via the first communication link to the UE, the preceding downlink transmission activating a second communication link over a second frequency channel of a second frequency band, receive an indication from the UE that indicates whether the UE can viably connect an uplink for the second communication link, transmit a downlink transmission over the second communication link, and receive uplink control information for the downlink transmission over an uplink for the first communication link or the uplink for the second communication link based at least in part on the indication.

A non-transitory computer readable medium for wireless communication is described. The non-transitory computer-readable medium may include instructions operable to cause a processor to determine, based at least in part on a first channel access procedure, that a first frequency channel of a first frequency band is available for use by a first communication link to a UE, transmit a preceding downlink transmission via the first communication link to the UE, the preceding downlink transmission activating a second communication link over a second frequency channel of a second frequency band, receive an indication from the UE that indicates whether the UE can viably connect an uplink for the second communication link, transmit a downlink transmission over the second communication link, and receive uplink control information for the downlink transmission over an uplink for the first communication link or the uplink for the second communication link based at least in part on the indication.

Some examples of the method, apparatus, and non-transitory computer-readable medium described above may further include processes, features, means, or instructions for identifying a timing offset between the preceding downlink transmission and the downlink transmission, wherein the downlink transmission may be transmitted based at least in part on the timing offset.

Some examples of the method, apparatus, and non-transitory computer-readable medium described above may further include processes, features, means, or instructions for determining that the second frequency channel may be available based at least in part on a second channel access procedure for the second frequency channel at the timing offset.

In some examples of the method, apparatus, and non-transitory computer-readable medium described above, the downlink transmission may be asynchronous to the preceding downlink transmission.

Some examples of the method, apparatus, and non-transitory computer-readable medium described above may further include processes, features, means, or instructions for configuring the UE with a number of HARQ processes for a downlink for the second communication link. Some examples of the method, apparatus, and non-transitory computer-readable medium described above may further include processes, features, means, or instructions for transmitting a plurality of downlink transmissions over the downlink for the second communication link, the plurality of downlink transmissions corresponding to the number of HARQ processes. Some examples of the method, apparatus, and non-transitory computer-readable medium described above may further include processes, features, means, or instructions for monitoring for HARQ acknowledgement from the UE for the plurality of downlink transmissions, wherein transmission to the UE over the downlink for the second communication link may be suspended until the HARQ acknowledgement may be received.

Some examples of the method, apparatus, and non-transitory computer-readable medium described above may further include processes, features, means, or instructions for transmitting, to the UE, a RRQ over the first communication link, wherein the RRQ indicates reservation of the first frequency channel by a base station. Some examples of the method, apparatus, and non-transitory computer-readable medium described above may further include processes, features, means, or instructions for receiving, from the UE, a RRS over the first communication link, wherein the preceding downlink transmission may be transmitted from the base station based at least in part on the RRS.

In some examples of the method, apparatus, and non-transitory computer-readable medium described above, the RRQ indicates a set of UEs to be scheduled on the second communication link, the set of UEs comprising the UE.

In some examples of the method, apparatus, and non-transitory computer-readable medium described above, the RRQ indicates a timing offset between the preceding downlink transmission and the downlink transmission.

In some examples of the method, apparatus, and non-transitory computer-readable medium described above, the RRS indicates whether the UE can viably connect the uplink for the second communication link.

In some examples of the method, apparatus, and non-transitory computer-readable medium described above, the first frequency channel comprises a licensed frequency channel and the second frequency channel comprises an unlicensed frequency channel or a shared-spectrum frequency channel.

In some examples of the method, apparatus, and non-transitory computer-readable medium described above, the preceding downlink transmission and the downlink transmission may be transmitted from respective antenna arrays of a same base station.

In some examples of the method, apparatus, and non-transitory computer-readable medium described above, the preceding downlink transmission may be transmitted from a first base station and the downlink transmission may be transmitted from a second base station.

In some examples of the method, apparatus, and non-transitory computer-readable medium described above the indication indicates that the UE cannot viably connect the uplink for the second communication link. Some examples of the method, apparatus, and non-transitory computer-readable medium described above may further include processes, features, means, or instructions for receiving the uplink control information for the downlink transmission over the uplink for the first communication link. Some examples of the method, apparatus, and non-transitory computer-readable medium described above may further include processes, features, means, or instructions for receiving a second indication from the UE that indicates that the UE can viably connect the uplink for the second communication link. Some examples of the method, apparatus, and non-transitory computer-readable medium described above may further include processes, features, means, or instructions for transmitting a third downlink transmission over the second communication link. Some examples of the method, apparatus, and non-transitory computer-readable medium described above may further include processes, features, means, or instructions for receiving, from the UE, uplink control information for the third downlink transmission via the uplink for the second communication link.

DETAILED DESCRIPTION

Support of communication over multiple frequency bands may provide benefits in coverage or throughput for a wireless communications system. Different frequency bands may exhibit different communication characteristics. For example, transmissions on higher frequencies may generally experience larger path loss. Such frequency-dependent characteristics may lead to communications over the higher frequency bands being supported over a smaller coverage range than otherwise similar communications (e.g., communications associated with similar transmission power) over the lower frequency bands. Such limitations may in some cases be ameliorated through the use of beamforming techniques, whereby signals are transmitted such that they constructively interfere at a receiving device. However, beamforming may be resource intensive (e.g., such that it may drain energy from power-limited devices, may generate signaling overhead that reduces system throughput, etc.) and may not be useful for all types of communication. Accordingly, the described techniques provide for a framework of operation whereby higher-band (e.g., mmW band) communications may be anchored to communications over a lower frequency band.

Aspects of the disclosure are initially described in the context of a wireless communications system. Aspects of the disclosure are further illustrated by and described with reference to network configurations, transmission schemes, and process flows. Aspects of the disclosure are further illustrated by and described with reference to apparatus diagrams, system diagrams, and flowcharts that relate to channel access mechanisms for multi-band operation.

Figure 1:
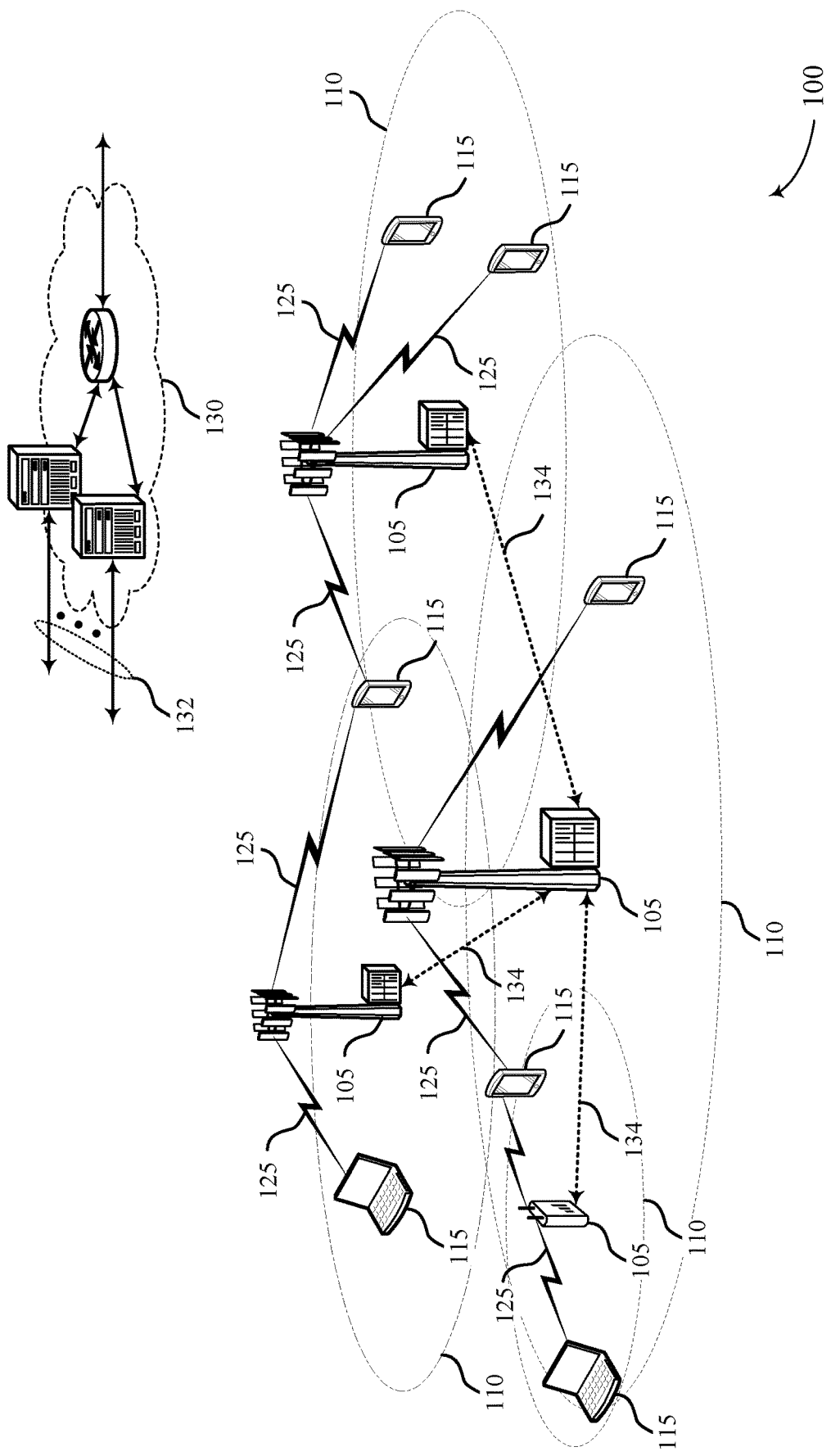
FIG. 1 illustrates an example of a system for wireless communication that supports channel access mechanisms for multi-band operation in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE network, an LTE-Advanced (LTE-A) network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

A base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID) or a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, an augmented reality/virtual reality (AR/VR) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated may be determined based at least in in part on signals transmitted in different beam directions. For example, a UE 115 may receive one or more reference signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "receive beamforming" according to different receive beams or receive directions. In some examples a receiving device may use a single receive beam to receive along a single beam direction (e.g., when receiving a data signal). The single receive beam may be aligned in a beam direction determined based at least in part on receive beamforming according to different receive beam directions (e.g., a beam direction determined to have a highest signal strength, highest signal-to-noise ratio, or otherwise acceptable signal quality based at least in part on receive beamforming according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval. In some examples, a wireless device may support multiple HARQ processes at the same time, which may improve throughput (e.g., because multiple code blocks may be transmitted in parallel rather than sequentially following acknowledgement of the preceding code block).

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Figure 2:
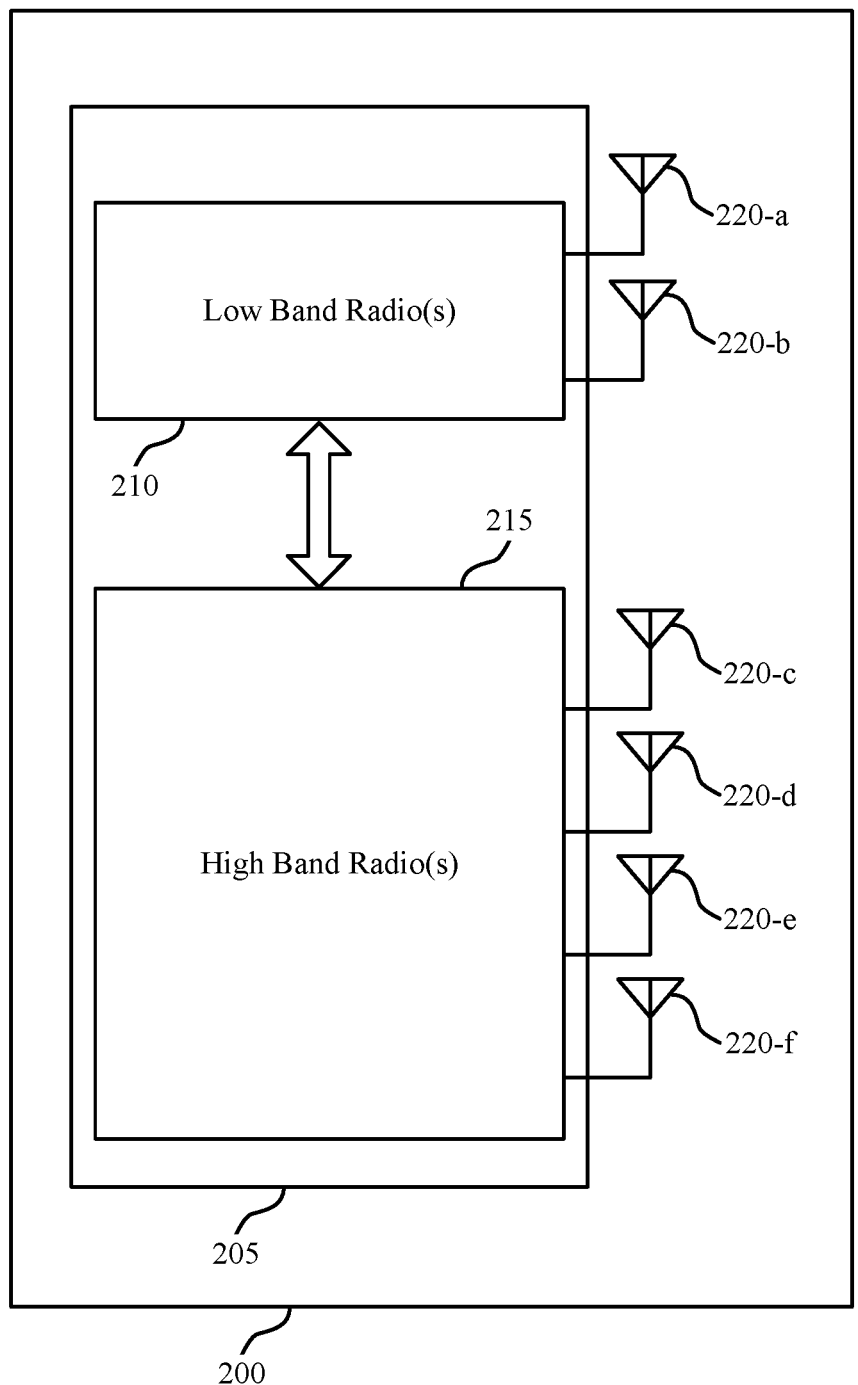
FIG. 2 illustrates an example of a wireless device that supports channel access mechanisms for multi-band operation in accordance with aspects of the present disclosure.

FIG. 2 illustrates an example of a wireless device 200 that supports channel access mechanisms for multi-band operation in accordance with various aspects of the present disclosure. In some examples, wireless device 200 may implement aspects of wireless communication system 100. For example, wireless device 200 may be an example of a base station 105 or a UE 115 as described with reference to FIG. 1. In some cases, wireless device 200 may be an example of a network entity (e.g., a coordinating entity).

Wireless device 200 includes one or more low-band radios 210 and one or more high-band radios 215, which may be components of a wireless communications manager 205 (e.g., which may be an example of or implement aspects of a communications manager as described below). For example, a given low-band radio 210 may support sub 6 GHz communications while a given high-band radio 215 may support communications above 6 GHz, or between 30 GHz and 300 GHz (e.g., mmW communications). Various techniques for providing internal synchronization between the low-band radio(s) 210 and the high-band radio(s) 215 are considered. As discussed above, high-band radio 215 communicate over smaller path distances (e.g., especially in NLOS environments) than low-band radio 210. However, spectrum resources may be more plentiful at frequencies used by high-band radio 215. In addition, using a higher density pattern of base stations 105 for communication over higher frequencies such as mmW increases frequency reuse and thus increases capacity. Because of such coverage differences, a high density arrangement of base stations 105 suited for mmW communication may not be suited for efficient use of the low-band frequency resources. That is, because of the lower degrees of signal attenuation associated with low-band communications and small achievable ISDs (e.g., to reduce coverage gaps for high-band communications), some wireless devices 200 may communicate using only high-band radio(s) 215 (e.g. and may suspend communications over low-band radio(s) 210). Such deployments may reduce interference over the low-band or otherwise benefit a wireless communications system. In some cases, a given transmission deployment (e.g., in which certain wireless devices 200 suspend communications over a low-band radio 210) may be a result of a configuration (e.g., during deployment) or may be a result of self-organizing network (SON) functionality.

In accordance with the described techniques, a wireless device 200 may use the low-band radio 210 (e.g., which may be associated with wider coverage) for synchronizing timing with other neighboring wireless devices 200 (e.g., may transmit discovery reference signals (DRSs) on the low-band). In some cases, each radio may be associated with one or more antennas 220. For example, an antenna 220 may refer to a given collection of antenna elements in an antenna array. In this example, low-band radio 210 supports communications over antennas 220-*a*, 220-*b* (e.g., which may be located in a first antenna array associated with a first antenna spacing) while high-band radio 215 supports communications over antennas 220-*c*, 220-*d*, 220-*e*, 220-*f* (e.g., which may be associated with a second antenna spacing). In some examples, high-band radio(s) 215 may be associated with multiple antenna panels (e.g., which each may include multiple antennas and corresponding phase control circuits). As described further below, some wireless devices 200 may support multiple communication links over low-band radio 210 and/or high-band radio 215 (e.g., to allow for carrier aggregation and/or dual connectivity).

Figure 3:
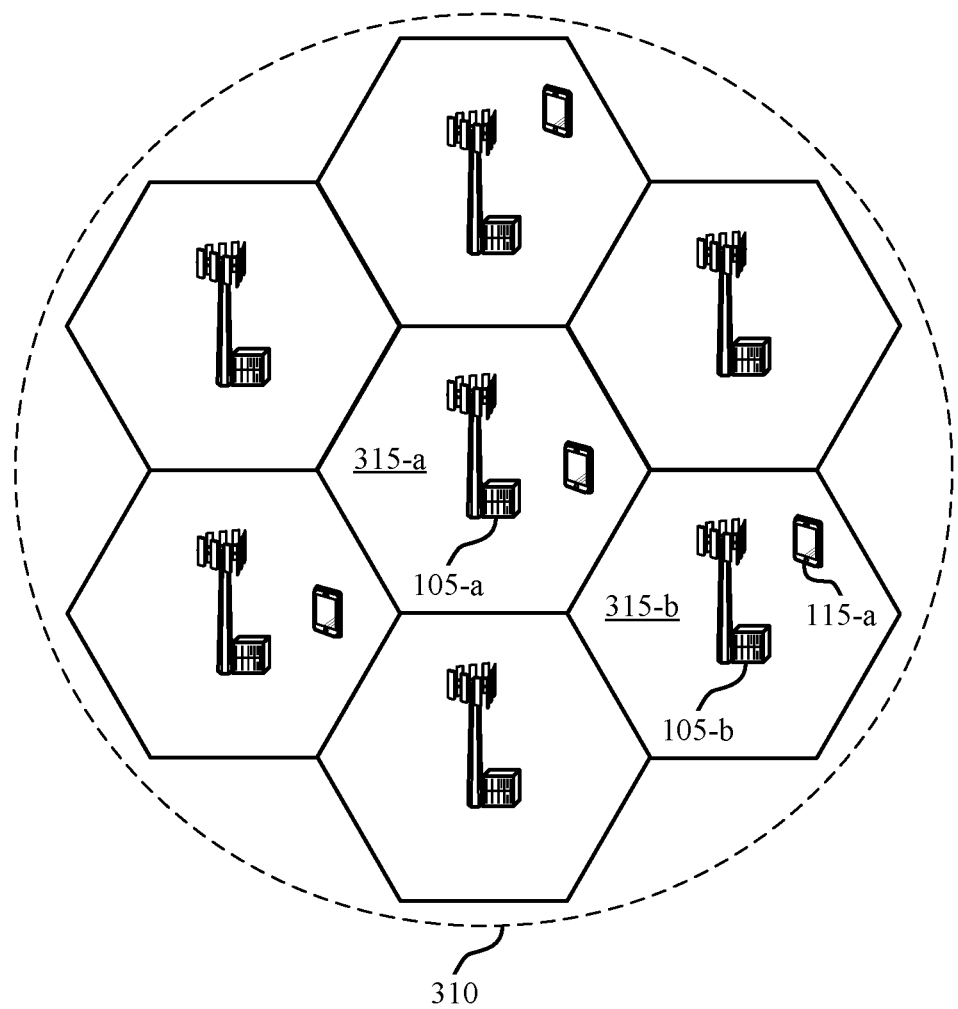
FIG. 3 illustrates an example of a network configuration that supports channel access mechanisms for multi-band operation in accordance with aspects of the present disclosure.

FIG. 3 illustrates an example of a network configuration 300 that supports channel access mechanisms for multi-band operation in accordance with various aspects of the present disclosure. In some examples, network configuration 300 may implement aspects of wireless communication system 100. Network configuration 300 may in some cases be based on SON functionality. For example, base station 105-*a* (e.g., which may be an example of any of the corresponding devices above) may be an example of an anchor device that provides low-band communications for a low-band coverage area 310. Each base station 105 within low-band coverage area 310 may be a serving base station for a cell that provides coverage for a respective high-band coverage area 315.

As described above, coverage constraints on the high-band communications (e.g., relative to the low-band communications) results in a topology with multiple high-band base stations 105 (e.g., base stations 105 in which communications over a low-band radio are suspended) in the low-band coverage area 310 of an anchor base station (e.g., base station 105-*a*). It is to be understood that network configuration 300 is included for the sake of illustration, such that the deployment of the base stations 105 may not fit a regular pattern (e.g., which may in some cases result in coverage gaps in high-band coverage areas 315).

In accordance with the described techniques, cells of the base stations 105 may be synchronized (e.g., have synchronized frame timing). Base stations 105 may synchronize using backhaul signaling (e.g., in cases where deterministic or ideal backhaul is present), or the base stations 105 may utilize their respective low-band radios to achieve over-the-air (OTA) synchronization (e.g., based on DRS transmissions from base station 105-*a*). By way of example, base station 105-*b* may be an example of a high-band base station 105 (e.g., a multi-band-capable base station operable to support communications over a high-band within coverage area 315-*b*). Base station 105-*b* may transmit downlink data to UE 115-*a* over the high-band, while base station 105-*a* may communicate with UE 115-*a* over the low-band. For example, base station 105-*a* may communicate control information (e.g., ACK/NACK, downlink control information, etc.) with UE 115-*a* over the low-band.

In some cases, channel aggregation may be supported (e.g., across different bands using different radios associated with the same base station 105 or with different base stations 105). For example, the low-band (e.g., which all base stations 105 may be operable to support) may enable the combination of multiple carriers (e.g., which may be referred to as CA or dual connectivity). Similarly, high-band operation may be supported by some or all devices (e.g., base stations and UEs). For example, a given UE 115 may support a single mmW channel at a time. That is, the operator may configure some UEs on a licensed high-band and some UEs on a shared spectrum high-band. Additionally or alternatively, a UE 115 may simultaneously support multiple high-band channels (e.g., with a single RF module). For example, such a design may involve synchronization between the high-band channels and result in higher complexity/power requirements for communicating devices.

Aspects of the following are described in the context of a UE 115 that supports a single mmW-band at a time. In these examples, different operators may have independent timing on their low-band and high-band communications. For example, mmW operators using shared spectrum may have a common timing (e.g., across operators). The mmW shared spectrum model may be realized using a TDD approach (e.g., in which a common TDD configuration is employed across operators who pool their shared spectrum for higher trunking efficiency). Such a model may in some cases employ a LBT-based approach (e.g., a one shot LBT) with operators pooling resources together. Various channel access modes are described in detail below. In some cases, the high-band behavior for licensed and unlicensed (e.g., shared) spectra may be similar.

Figure 4A:
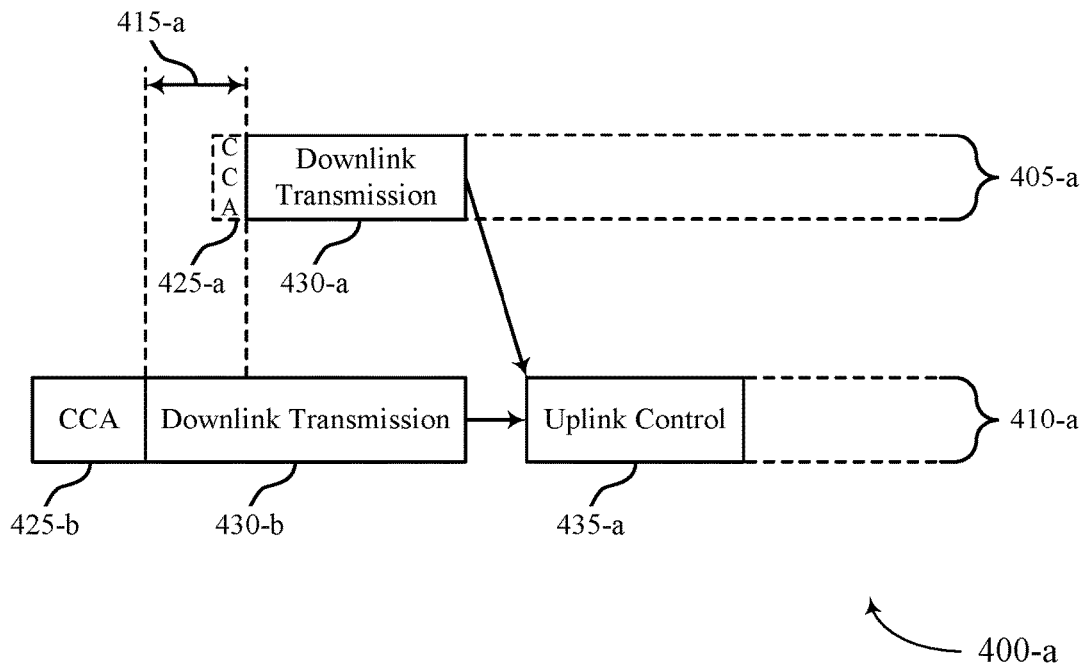
FIGS. 4A, 4B, 5, 6A, and 6B illustrate example transmission schemes that support channel access mechanisms for multi-band operation in accordance with aspects of the present disclosure.

FIG. 4A illustrates an example of a transmission scheme 400-a that supports channel access mechanisms for multi-band operation in accordance with various aspects of the present disclosure. In some examples, transmission scheme 400-a may implement aspects of wireless communication system 100. Transmission scheme 400-a may illustrate, for example, communications for a UE 115-a that is configured for communications over a low-band communication link 410-a and a high-band communication link 405-a (e.g., in a carrier aggregation or dual-connectivity configuration). Transmission scheme 400-a may support synchronous multi-band operation. For example, the transmission timing on high-band communication link 405-a may be anchored to the transmission timing on a low-band communication link 410-a.

In the present example, the communication links may be associated with transmissions originating at the same device or with transmissions from different devices. In some examples, low-band communication link 410-a is carried over a shared (e.g., or unlicensed) channel. Accordingly, a first base station may contend for channel access on a first frequency channel associated with low-band communication link 410-a (e.g., may perform clear channel assessment (CCA) 425-a on the low-band). In some examples, CCA 425-b is a category 4 (Cat 4) LBT. Alternatively, low-band communication link 410-a may be carried over a licensed channel (e.g., in which case CCA 425-b may not be performed). Upon gaining access to the first frequency channel, the first base station may transmit downlink transmission 430-b on low-band communication link 410-a. Downlink transmission 430-b may contain control information indicating activation of transmissions over a second communication link (e.g., high-band communication link 405-a). After an offset 415-a, a downlink transmission 430-a may be transmitted via a second communication link (e.g., high-band communication link 405-a). The offset 415-a may be selected to provide time for a UE 115 to enable a radio used for receiving transmissions over the high-band communication link 405-a. The offset 415-a may be, for example, tens of microseconds, hundreds of microseconds, or a few milliseconds, in some cases. In some cases, downlink transmission 430-a may occur in a range after the expiration of the offset 415-a. That is, the timing of downlink transmission 430-a may not be synchronous in terms of symbol periods or even slots or subframes, and may, for example, be subject to LBT (e.g., one-shot CCA). Downlink transmission 430-b may allocate uplink resources of low-band communication link 410-a for a subsequent uplink transmission (e.g., uplink control 435-a).

In the present examples, low-band communication link 410-a may be associated with a larger coverage area than high-band communication link 405-a. Accordingly, multiple base stations each supporting one or more high-band communication links 405 may lie within the coverage area associated with low-band communication link 410-a (e.g., as described with reference to network configuration 300). Accordingly, in some examples, downlink transmission 430-b may originate at a central (e.g., anchor) base station such as base station 105-a as described with reference to FIG. 3. High-band communication link 405-a may be associated with a peripheral base station of network configuration 300 (e.g., base station 105-b). Accordingly, downlink transmissions 430-a, 430-b may be synchronized using signaling between the low-band radios of each transmitting base station (e.g., OTA synchronization). Additionally or alternatively, synchronization may be provided via wired or wireless backhaul links. In other examples, downlink transmissions 430-a, 430-b may originate from the same base station (e.g., from a high-band radio and a low-band radio, respectively), in which case the transmissions may be synchronized by way of internal synchronization between the radios (e.g., as described with reference to FIG. 2).

Accordingly, while aspects of the following are described with reference to one of these examples (e.g., downlink transmissions 430 originating at the same base station or at different base stations), it is to be understood that the examples are not limiting of scope (e.g., such that the described techniques or analogous techniques may be extended to the other use case). In the present example, a second base station may transmit downlink transmission 430-a over high-band communication link 405-a. The second base station may optionally perform CCA 425-a before downlink transmission 430-a (e.g., if high-band communication link 405-a is carried over a shared channel).

A target receiving device (e.g., UE 115-a as described with reference to FIG. 3) may receive downlink transmission 430-b over a downlink of low-band communication link 410-a. For example, the receiving device may in some cases be equipped with multiple radios and may receive downlink transmission 430-b over a low-band radio while maintaining a high-band radio in an inactive mode (e.g., to conserve energy). Based on downlink transmission 430-b, the receiving device may accordingly activate the high-band radio to monitor for a subsequent data transmission over high-band communication link 405-a. The receiving device may identify a timing offset 415-a between downlink transmission 430-b and downlink transmission 430-a. The timing offset 415-a may be associated with a length of time for UE 115-a to enable a second radio (e.g., from a power-save or disabled state) for receiving the high-band channel 405-a. In some cases, the timing offset 415-a may be UE-specific (e.g., may be determined according to a UE capability or UE configuration message) or may be specific to a given cell associated with high-band communication link 405-a (e.g., or a cell associated with low-band communication link 410-a). Based on timing offset 415-a, the receiving device may receive downlink transmission 430-a over high-band communication link 405-a.

The receiving device may subsequently transmit uplink control 435-a (e.g., which may include acknowledgement information, beam management information, link management information, some combination thereof, etc.) over the low-band communication link 410-a. Uplink control 435-a may contain respective acknowledgement information for downlink transmissions 430-a, 430-b. Because uplink control 435-a is transmitted over low-band communication link 410-a, it may be received by the first base station (e.g., which may correspond to base station 105-a). The first base station may indicate to the second base station (e.g., via OTA signaling and/or backhaul) the uplink control information, which may in turn impact a subsequent downlink transmission 430 over high-band communication link 405-a.

Accordingly, transmission scheme 400-a illustrates synchronous transmission between bands in a multi-band system. As described, the high-band radio for some communicating devices may be maintained in a power-save (e.g., powered-off) mode if scheduling is supported over the low-band radios. By transmitting uplink information on the low-band communication link 410-a, various communication improvements may be realized. For example, the transmissions may propagate further than corresponding transmissions on a high-band channel, the transmitting device may conserve power, etc.

Figure 4B:
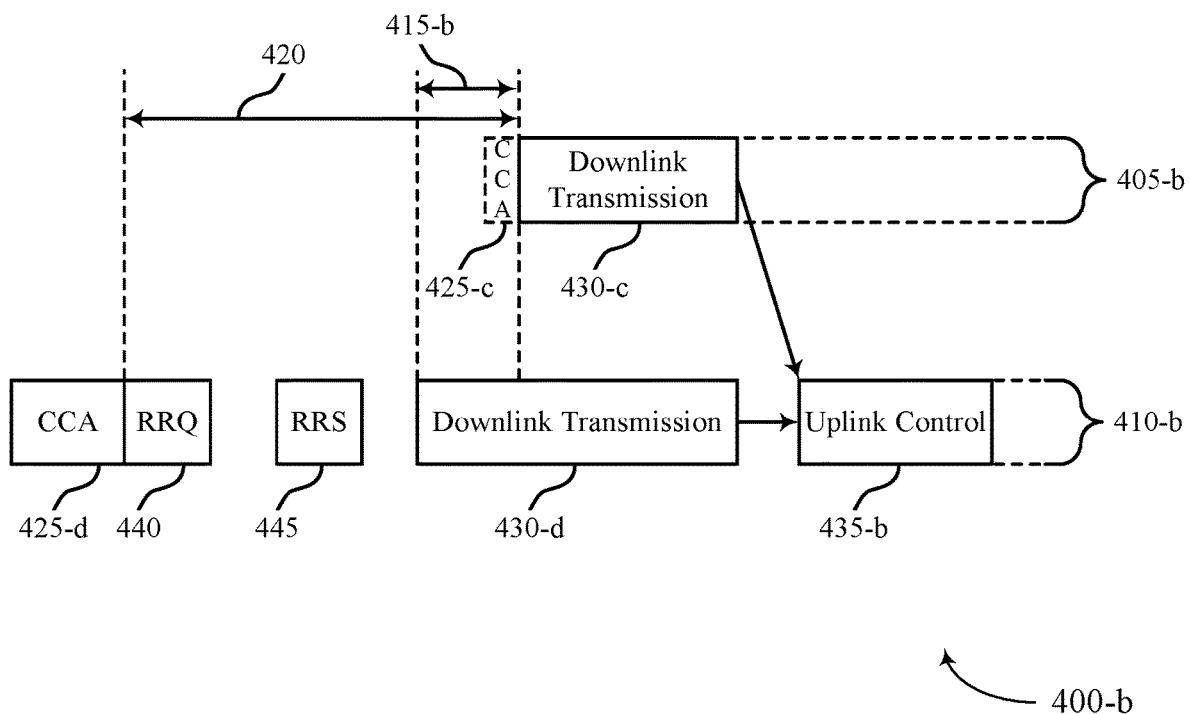

FIG. 4B illustrates an example of a transmission scheme 400-*b* that supports channel access mechanisms for multi-band operation in accordance with various aspects of the present disclosure. In some examples, transmission scheme 400-*b* may implement aspects of wireless communication system 100. Transmission scheme 400-*b* may illustrate, for example, communications for a UE 115-*a* that is configured for communications over a low-band communication link 410-*b* and a high-band communication link 405-*b* (e.g., in a carrier aggregation or dual-connectivity configuration). Transmission scheme 400-*b* may support synchronous multi-band operation. For example, the transmission timing on high-band communication link 405-*b* may be anchored to the transmission timing on a low-band communication link 410-*b*.

Similarly to transmission scheme 400-*a*, a first base station may transmit a downlink transmission 430-*d* over a downlink of low-band communication link 410-*b* containing control information. A receiving device may identify a timing offset 415-*b* and monitor for downlink transmission 430-*c* (e.g., which may optionally be preceded by CCA 425-*c*) on high-band communication link 405-*b*. The receiving device may subsequently transmit uplink control 435-*b* on an uplink of the low-band communication link 410-*b*.

In the present example, a predictable TTI may be provided through the use of a resource reservation request/ resource reservation response (RRQ/RRS) handshake between the first base station and the receiving device over low-band channel 410-*b*. For example, the first base station may transmit RRQ 440 (e.g., after performing CCA 425-*d*) and the receiving device may respond with RRS 445. In some examples, the RRQ/RRS handshake may alternatively be referred to as a request-to-send/clear-to-send (RTS/CTS) event. The RRQ/RRS handshake may allow for self-contained operation. That is, in addition to other benefits provided by the RRQ/RRS (e.g., addressing the hidden node problem), the handshake may allow the receiving device to identify a second offset 420 (e.g., longer than timing offset 415-*b*). The longer offset may allow the receiving device more time to enable a high-band radio or otherwise prepare to receive downlink transmission 430-*c*. In some examples, the synchronous operation described with reference to transmission schemes 400-*a*, 400-*b* may enable coordinated multi-point (COMP) operation (e.g., across multiple low-band radios, which may be located at different base stations or may be associated with different antenna arrays of the same base station). In some cases, RRQ 440 may indicate a set of wireless devices to be scheduled on high-band communication link 405-*b*. Additionally or alternatively, RRQ 440 may indicate a timing offset (e.g., timing offset 415-*b*) between downlink transmissions 430-*d*, 430-*c*. In some cases, RRS 445 may indicate whether a receiving device (e.g., a UE 115) is able to viably connect or close an uplink over high-band communication link 405-*b*. The ability of the receiving device or the UE to close the uplink refers to a determination at the UE that it can support the uplink without violating one or more constraints and to a determination at the UE that it may successfully transmit an uplink transmission to a base station. The terms viably connect and close may be used interchangeably herein.

Figure 5:
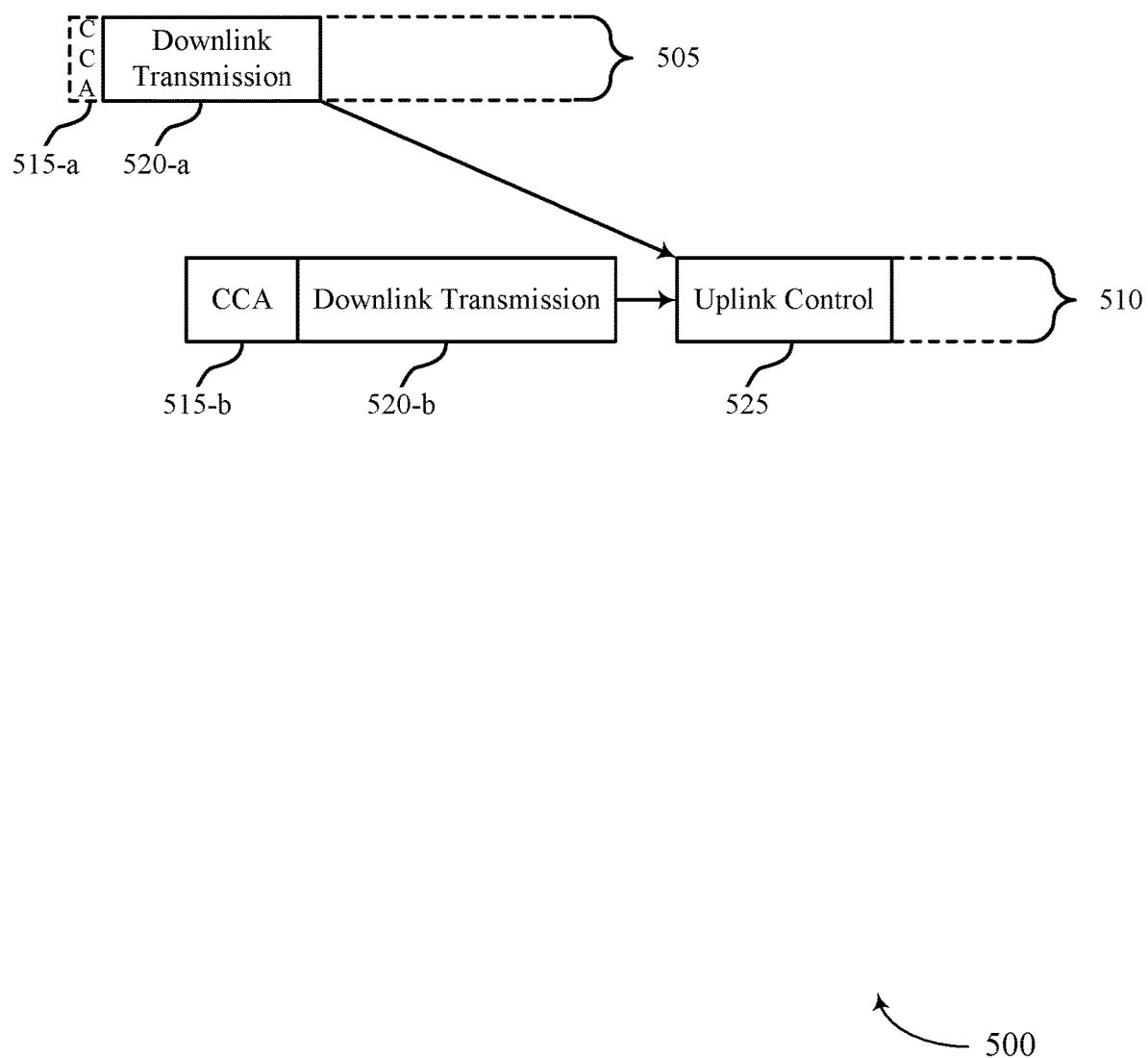

FIG. 5 illustrates an example of a transmission scheme 500 that supports channel access mechanisms for multi-band operation in accordance with various aspects of the present disclosure. In some examples, transmission scheme 500 may implement aspects of wireless communication system 100. Transmission scheme 500 may support asynchronous multi-band operation. Transmission scheme 500 may illustrate, for example, communications for a UE 115-*a* that is configured for communications over a low-band communication link 510 and a high-band communication link 505 (e.g., in a carrier aggregation or dual-connectivity configuration). In transmission scheme 500, downlink transmissions over the low-band communication link 510 and the high-band communication link 505 are asynchronous (e.g., the timing of transmissions over the high-band communication link 505 are not anchored to transmission timing over the low-band communication link 510, and may be self-scheduled).

By way of example, a first base station may transmit downlink transmission 520-*a* (e.g., after optionally performing CCA 515-*a* over a first frequency channel associated with high-band communication link 505) over a downlink of high-band communication link 505. A second base station (e.g., or a second radio of the first base station) may perform CCA 515-*b* for a second frequency channel associated with low-band communication link 510 and transmit downlink transmission 520-*b* over low-band communication link 510 upon sensing an idle medium. The timing of downlink transmission 520-*a* is asynchronous to downlink transmission 520-*b* (e.g., downlink transmission 520-*a* may occur prior to or concurrently with downlink transmission 520-*b*). The downlink transmission may include an uplink resource allocation 525. Upon receiving downlink transmission 520-*a*, a UE (e.g., UE 115-*a*) may determine uplink control information (e.g., ACK information) for downlink transmission 520-*a*, and suspend a HARQ process associated with downlink transmission 520-*a* until uplink resource allocation 525 on low-band channel 510 is identified. The UE 115 may then transmit control information associated with downlink transmission 520-*a* and downlink transmission 520-*b* in the uplink resource allocation 525. Thus, uplink control information associated with downlink transmission 520-*a* may be transmitted to the second base station, which may convey the information to the first base station (e.g., via OTA signaling or backhaul) such that a subsequent downlink transmission 520 over high-band communication link 505 for the given HARQ process may be influenced by uplink control 525. The UE 115 may have multiple scheduled HARQ processes, and when data associated with an existing HARQ process is received via the high-band communication link 505, the HARQ process may wait until the ACK information is received before continuing (e.g., with a retransmission or new transmissions). Determining whether the ACK information for downlink transmission 520-*a* is included within a given uplink resource allocation 525 on the low-band communication link 510 may be performed according to the timing of the downlink transmissions 520 over the low-band and high-band communication links. For example, if the resource grant for uplink resource allocation 525 is received prior to the end of downlink transmission 520-*a*, the ACK information for the downlink transmission 520-*a* may be included in the uplink resource allocation 525. Otherwise, the ACK information may be held until the next available uplink resource grant.

Techniques for providing predictable uplink opportunities (e.g., for quality of service (QoS) requirements) are considered. That is, because the uplink resource allocation 525 may be subject to channel access on an unlicensed low-band spectrum (e.g., low-band communication link 510 may be carried over shared channel), the high-band radio of the receiving device may stall (e.g., due to a full data buffer while waiting for an ACK opportunity on low-band communication link 510). Accordingly, in some cases high-band uplink control opportunities may be provided, as described further below.

Figure 6A:
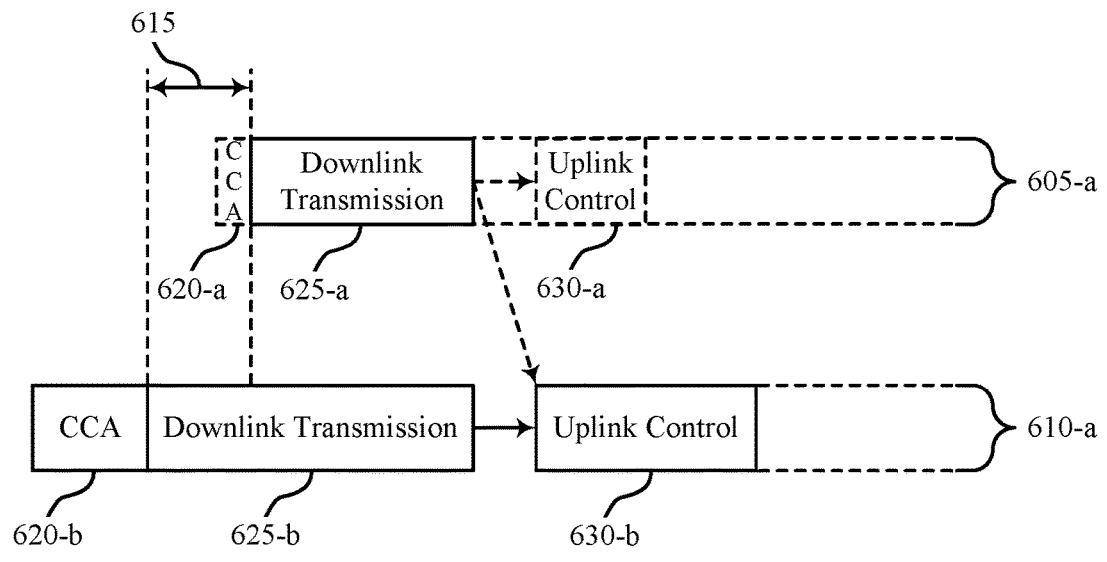

FIG. 6A illustrates an example of a transmission scheme 600-a that supports channel access mechanisms for multi-band operation in accordance with various aspects of the present disclosure. In some examples, transmission scheme 600-a may implement aspects of wireless communication system 100. Transmission scheme 600-a may illustrate, for example, communications for a UE 115-a that is configured for communications over a low-band communication link 610-a and a high-band communication link 605-a (e.g., in a carrier aggregation or dual-connectivity configuration). Transmission scheme 600-a may support synchronous multi-band operation. For example, the transmission timing on high-band communication link 605-a may be anchored to the transmission timing on a low-band communication link 610-a. Transmission scheme 600-a may be an example of transmission schemes 400-a, 400-b.

Similarly to transmission schemes 400-a, 400-b, a first base station may transmit a downlink transmission 625-b over a downlink of low-band communication link 610-a containing control information. A receiving device may identify a timing offset 615 and monitor for downlink transmission 625-a (e.g., which may optionally be preceded by CCA 620-a) on high-band communication link 605-a. The receiving device may subsequently transmit uplink control 630-b on the low-band communication link 610-a. In some cases, transmission scheme 600-a may include a RRQ/RRS handshake on a frequency channel associated with low-band communication link 610-a (e.g., as described with reference to transmission scheme 400-b).

Additionally, transmission scheme 600-a may augment transmission schemes 400-a, 400-b (e.g., by providing ACK opportunities over high-band communication link 605-a). Accordingly, in some cases, the receiving device may transmit uplink control 630-a over high-band communication link 605-a. For example, uplink control 630-a may be transmitted if CCA 620-b on a frequency channel associated with low-band communication link 610-a clears infrequently (e.g., such that the transmissions over high-band communication link 605-a are gated by the infrequent transmission opportunities on the low-band).

Accordingly, with reference to FIG. 3, a receiving device such as UE 115-a may transmit uplink control 630-b to a central base station (e.g., base station 105-a) and may transmit uplink control 630-a to a peripheral base station (e.g., base station 105-b). In some cases, base station 105-a (e.g., or some other network entity) may determine to enable ACK opportunities on high-band communication link 605-a based on at least one of a control information priority associated with high-band communication link 605-a, a data latency metric for downlink transmission 625-a, or a path loss metric for high-band communication link 605-a associated with UE 115-a. For example, the ACK opportunities may be enabled when the downlink transmission 625-a comprises time critical data. Such a unified architecture may be used to optimize throughput and latency constraints for a variety of use cases (e.g., while maintaining compatibility with longer-range/lower throughput coverage-limited use cases).

In some cases, the availability of ACK opportunities (e.g., which may alternatively be referred to as uplink control opportunities) on high-band communication link 605-a may be based at least in part on an ability of a receiving device to viably connect or close an uplink over the high-band communication link 605-a. The ability of the receiving device or the UE to viably connect or close the uplink refers to a determination at the UE that it can support the uplink without violating one or more constraints and to a determination at the UE that it may successfully transmit an uplink transmission to a base station. For example, with reference to FIG. 3, a receiving device such as UE 115-a may determine whether it is able to viably connect an uplink of a high-band communication link 605-a with a serving peripheral base station (e.g., base station 105-b). The ability of the UE to viably connect the uplink refers to a determination at the UE that it can support the uplink without violating one or more constraints. The determination may in some cases depend on power constraints of UE 115-a, a distance between the communicating devices, a utilization metric of the channel carrying the high-band communication link 605-a, etc. UE 115-a may indicate (e.g., in an uplink control transmission, an RRS, or some other signaling via low-band communication link 610-a) an ability to viably connect the uplink of the high-band communication link 605-a. If the UE 115-a signals an ability to viably connect the uplink for high-band communication link 605-a, the base stations 105 (e.g., or some other suitable network entity) may schedule uplink resources for UE 115-a over high-band communication link 605-a.

Figure 6B:
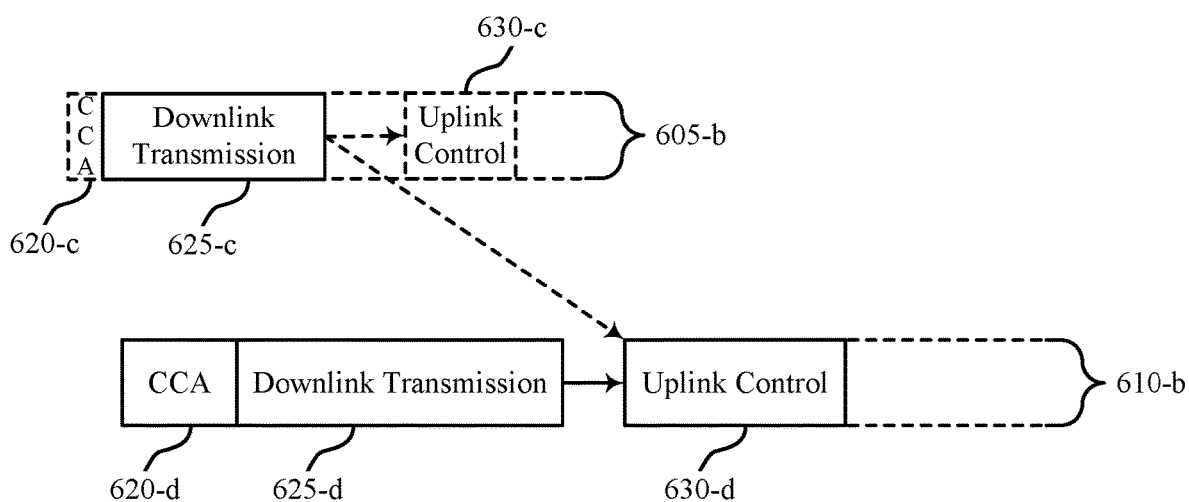

FIG. 6B illustrates an example of a transmission scheme 600-b that supports channel access mechanisms for multi-band operation in accordance with various aspects of the present disclosure. In some examples, transmission scheme 600-b may implement aspects of wireless communication system 100. Transmission scheme 600-b may illustrate, for example, communications for a UE 115-a that is configured for communications over a low-band communication link 610-b and a high-band communication link 605-b (e.g., in a carrier aggregation or dual-connectivity configuration). Transmission scheme 600-b may support asynchronous multi-band operation. Transmission scheme 600-b may be an example of transmission scheme 500.

Similarly to transmission scheme 500, a first base station may transmit downlink transmission 625-c (e.g., after optionally performing CCA 620-c) over a downlink of a high-band communication link 605-b. A second base station (e.g., or a second radio of the first base station) may perform CCA 620-d and transmit downlink transmission 625-d over low-band communication link 610-b upon sensing an idle medium. The downlink transmission may include a resource allocation for uplink control 630-d.

Additionally, transmission scheme 600-b may augment transmission scheme 500 (e.g., by providing ACK opportunities over high-band communication link 605-b) in cases where the UE 115-a can viably connect or close the uplink for high-band communication link 605-b. The ability of the UE to close the uplink refers to a determination at the UE that it can support the uplink without violating one or more constraints and to a determination at the UE that it may successfully transmit an uplink transmission to a base station. Accordingly, in some cases, the receiving device may transmit uplink control 630-c over high-band communication link 605-b. For example, uplink control 630-c may be transmitted if CCA 620-d on a frequency channel associated with low-band communication link 610-a clears infrequently (e.g., such that the transmissions over high-band communication link 605-b are gated by the infrequent transmission opportunities on the low-band).

In some cases, transmission schemes 600-a, 600-b may support operations in which low-band communication links 610 are licensed channels. For example, a deterministic low-band may allow predictable delays and channel access for low-band communication links 610 and high-band communication links 605.

Figure 7:
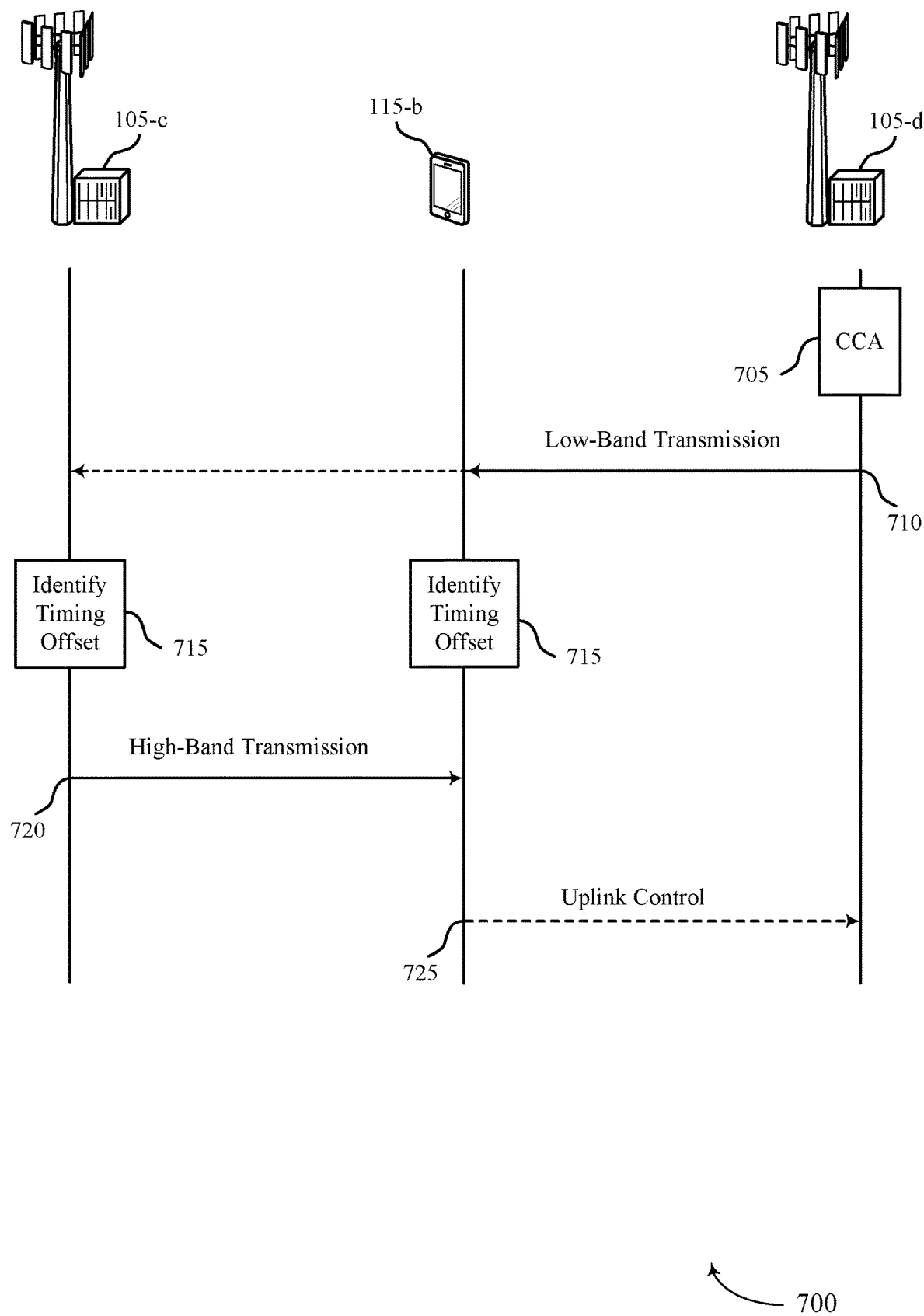
FIGS. 7 through 9 illustrate example process flows that support channel access mechanisms for multi-band operation in accordance with aspects of the present disclosure.

FIG. 7 illustrates an example of a process flow 700 that supports channel access mechanisms for multi-band operation in accordance with various aspects of the present disclosure. In some examples, process flow 700 may implement aspects of wireless communication system 100. Process flow 700 includes base stations 105-c, 105-d and UE 115-b, each of which may be an example of the corresponding devices described above. In aspects of the following, base station 105-d may be an example of a central base station in a network configuration supporting multi-band operation (e.g., base station 105-a as described with reference to FIG. 3) while base station 105-c may be an example of a peripheral base station (e.g., base station 105-b). Alternatively, base stations 105-c, 105-d may represent different antenna arrays each associated with a respective radio of a single base station 105.

At 705, base station 105-d may perform a CCA (e.g., a CAT 4 LBT) to determine an availability of a low-band channel. That is, the low-band channel may be an example of an unlicensed or shared channel such that base station 105-d may perform collision avoidance techniques.

At 710, upon detecting an idle medium, base station 105-d may transmit a low-band downlink transmission via a low-band communication link. For example the downlink transmission may contain scheduling information (e.g., and in some cases data). In some cases, the low-band downlink transmission may be received by UE 115-b and base station 105-c.

At 715, UE 115-b (e.g., and base station 105-c) may identify a timing offset between the low-band transmission at 710 and a downlink transmission. Based on the timing offset, base station 105-c may transmit a downlink transmission on a high-band communication link at 720. As described above, in some cases base stations 105-c, 105-d may be examples of different radios associated with a same base station (e.g., such that the high-band transmission may in some cases originate at the same base station as the low-band transmission at 710).

At 725, UE 115-b may transmit uplink control (e.g., ACK/NACK) for the low-band transmission and the high-band transmission to base station 105-d (e.g., over the low-band communication link). Additionally or alternatively, UE 115-b may in some cases optionally transmit control information for the high band transmission to base station 105-c over the high-band communication link.

Figure 8:
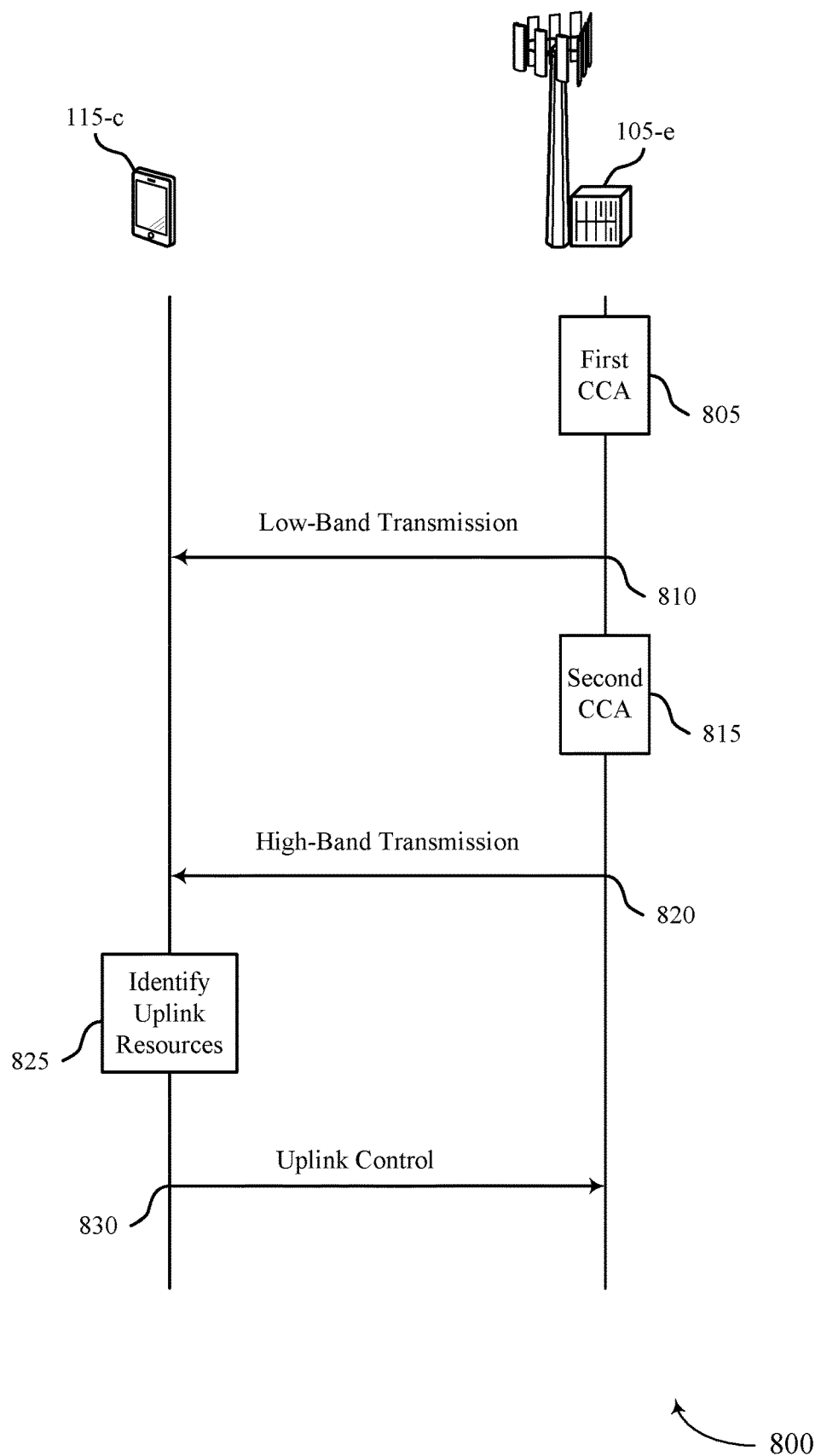

FIG. 8 illustrates an example of a process flow 800 that supports channel access mechanisms for multi-band operation in accordance with various aspects of the present disclosure. In some examples, process flow 800 may implement aspects of wireless communication system 100. Process flow 800 includes base station 105-e and UE 115-c, each of which may be an example of the corresponding device described above.

At 805, base station 105-e may perform a first CCA to detect a channel availability for a low-band channel. Upon detecting an idle medium, base station 105-e may transmit a low-band downlink transmission at 810 via a downlink of a low-band communication link. At 815, base station 105-e may perform a second CCA to detect channel availability for a high-band channel. At 820, base station 105-e may transmit a high-band downlink transmission (e.g., upon detecting that the high-band channel is idle) via a high-band communication link. As with process flow 700, in some examples the operations of base station 105-e in the current example may be performed by multiple base stations 105 (e.g., which may be associated with each other and operable to communicate via OTA signaling or backhaul networking). That is, in some cases 805 and 810 may be performed at a first base station while 815 and 820 are performed at a second base station.

At 825, UE 115-c may identify uplink resources based at least in part on the low-band transmission received at 810. For example, the uplink resources may be on an uplink of the low-band communication link and may be used to transmit control information (e.g., ACK/NACK) at 830. The control information at 830 may in some cases correspond to both the low-band transmission received at 810 and the high-band transmission received at 820. Additionally or alternatively, the control information at 830 may be associated with only the high band transmission received at 820 (e.g., may be an example of a high-band uplink ACK opportunity) such that the resources identified at 825 may in some cases correspond to resources of the high-band channel, as described further below.

Figure 9:
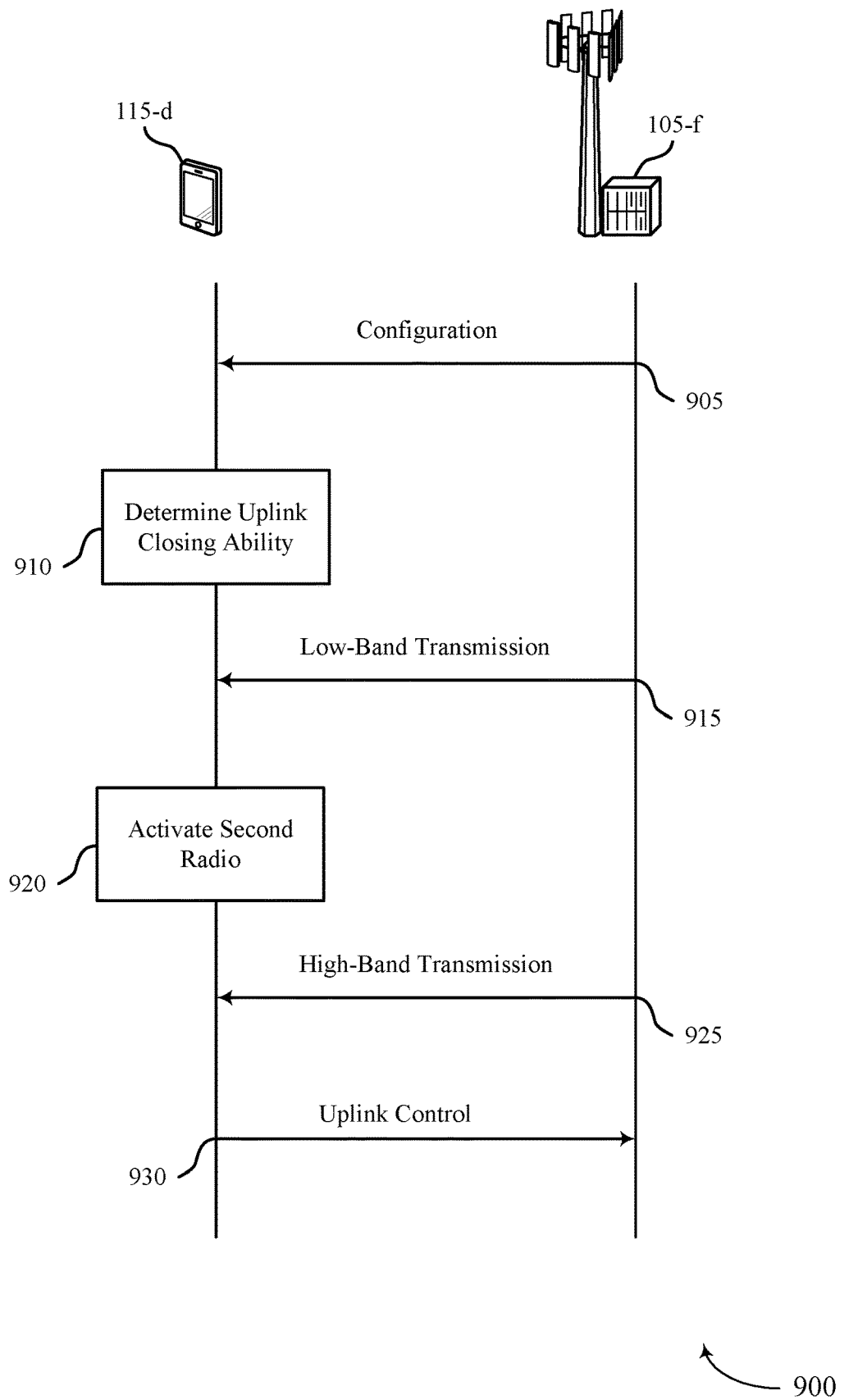

FIG. 9 illustrates an example of a process flow 900 that supports channel access mechanisms for multi-band operation in accordance with various aspects of the present disclosure. In some examples, process flow 900 may implement aspects of wireless communication system 100. Process flow 900 includes base station 105-f and UE 115-d, each of which may be an example of the corresponding device described above. In some cases, the operations of base station 105-f may be performed by different base stations 105. For example, a first base station 105 may be associated with low-band communications while a second base station 105 may be associated with high-band communications.

At 905, base station 105-f (e.g., or some other suitable network entity) may transmit a configuration for a high-band communication link to UE 115-d via an established low-band communication link. UE 115-d may receive the configuration via a first radio supporting communications over a first frequency band.

At 910, UE 115-d may determine an ability to viably connect or close an uplink for the configured high-band communication link. As discussed above, the ability to viably connect the uplink may in some cases depend on one or more power-based considerations for UE 115-d. For example, when UE 115-d is above a certain distance away from base station 105-f or is operating below a certain battery level, it may determine that the uplink cannot establish a viable connection or cannot successfully transmit an uplink transmission to a base station to establish a viable connection. Other considerations for determining whether the uplink can be closed or establish a viable connection are considered as discussed above. At 915, base station 105-f may transmit a low-band downlink transmission over a downlink of the low-band communication link. In some cases, the low-band downlink transmission may be contingent upon clearance of a channel access procedure. UE 115-d may receive the low-band downlink transmission via a low-band radio.

At 920, UE 115-d may activate a second radio (e.g., a radio associated with high-band communications). For example, UE 115-d may activate the second radio based at least in part on the configuration received at 905. Additionally or alternatively, UE 115-d may activate the second radio based at least in part on the low-band downlink transmission received at 915. For example, the low-band downlink transmission may contain scheduling information for a downlink transmission over the high-band communication link or may be used as a reference for a timing offset after which the downlink transmission is to be received.

At 925, base station 105-f (e.g., or another base station 105) may transmit the downlink transmission over the high-band communication link. UE 115-*d* may receive the downlink transmission over the radio activated at 920. At 930, UE 115-*d* may transmit uplink control information to base station 105-*f* (e.g., or another base station 105). The uplink control information may in some cases be transmitted over the low-band communication link and/or the high-band communication link.

Figure 10:
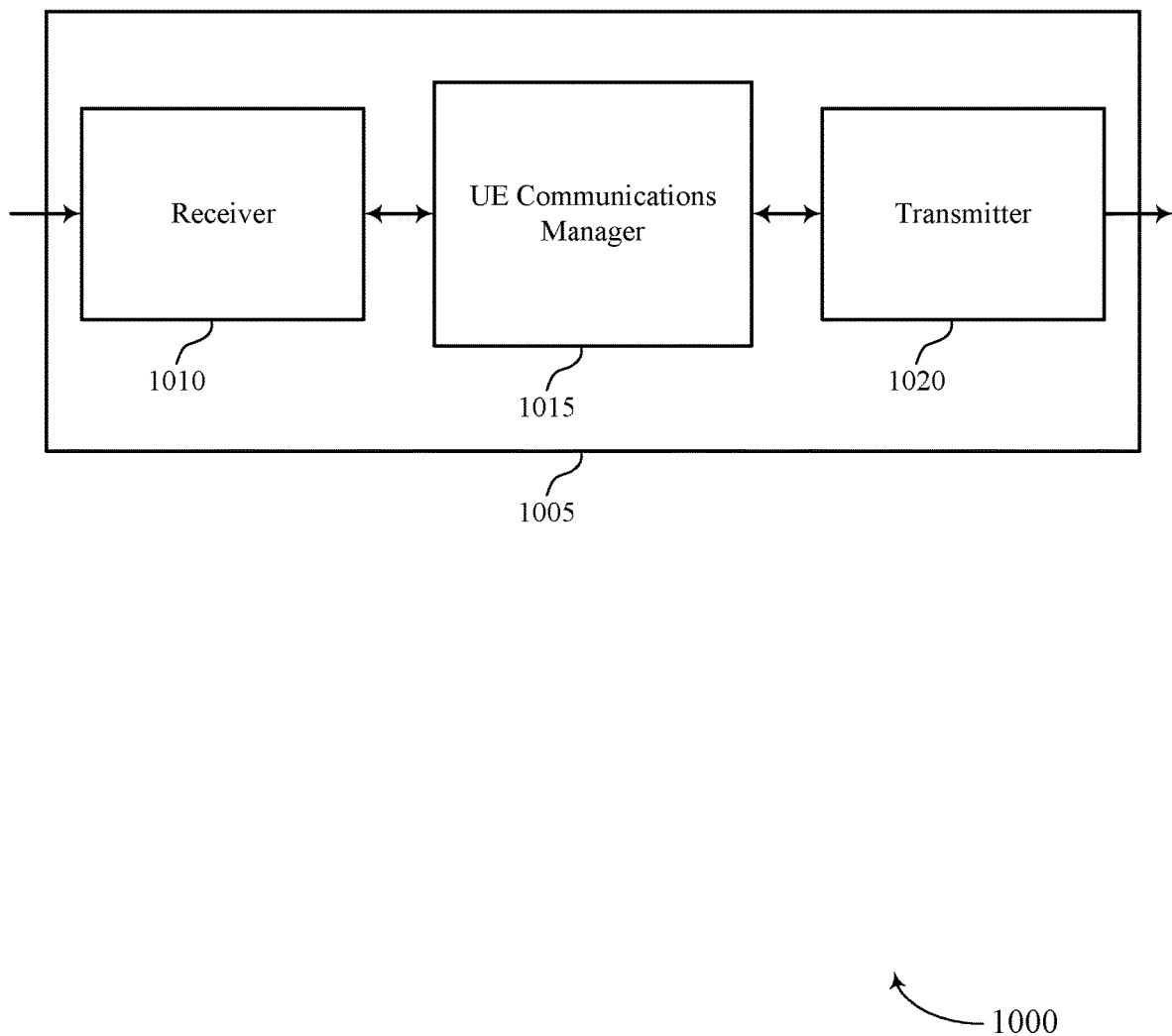
FIGS. 10 through 12 show block diagrams of a device that supports channel access mechanisms for multi-band operation in accordance with aspects of the present disclosure.

FIG. 10 shows a block diagram 1000 of a wireless device 1005 that supports channel access mechanisms for multi-band operation in accordance with aspects of the present disclosure. Wireless device 1005 may be an example of aspects of a user equipment (UE) 115 as described herein. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to channel access mechanisms for multi-band operation, etc.). Information may be passed on to other components of the device. The receiver 1010 may be an example of aspects of the transceiver 1335 described with reference to FIG. 13. The receiver 1010 may utilize a single antenna or a set of antennas.

UE communications manager 1015 may be an example of aspects of the UE communications manager 1315 described with reference to FIG. 13. UE communications manager 1015 and/or at least some of its various sub-components may be implemented in hardware, software executed by a processor, firmware, or any combination thereof. If implemented in software executed by a processor, the functions of the UE communications manager 1015 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 1015 and/or at least some of its various sub-components may be physically located at various positions, including being distributed such that portions of functions are implemented at different physical locations by one or more physical devices. In some examples, UE communications manager 1015 and/or at least some of its various sub-components may be a separate and distinct component in accordance with various aspects of the present disclosure. In other examples, UE communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In some cases, wireless device 1005 may have a first radio supporting communications via a first frequency band and a second radio supporting communications via a second frequency band. UE communications manager 1015 may receive, via a first communication link in the first frequency band, a configuration for a second communication link in the second frequency band. UE communications manager 1015 may determine whether an uplink for the second communication link can be viably connected. UE communications manager 1015 may receive, via the first radio, a preceding downlink transmission over the first communication link, activate the second radio based on the configuration. UE communications manager 1015 may receive, via the second radio, a downlink transmission over the second communication link. UE communications manager 1015 may transmit uplink control information for the downlink transmission over the first communication link or over the second communication link based on the determining whether the uplink for the second communication link can be viably connected or closed. The ability of the UE to close the uplink refers to a determination at the UE that it can support the uplink without violating one or more constraints and to a determination at the UE that it may successfully transmit an uplink transmission to a base station.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
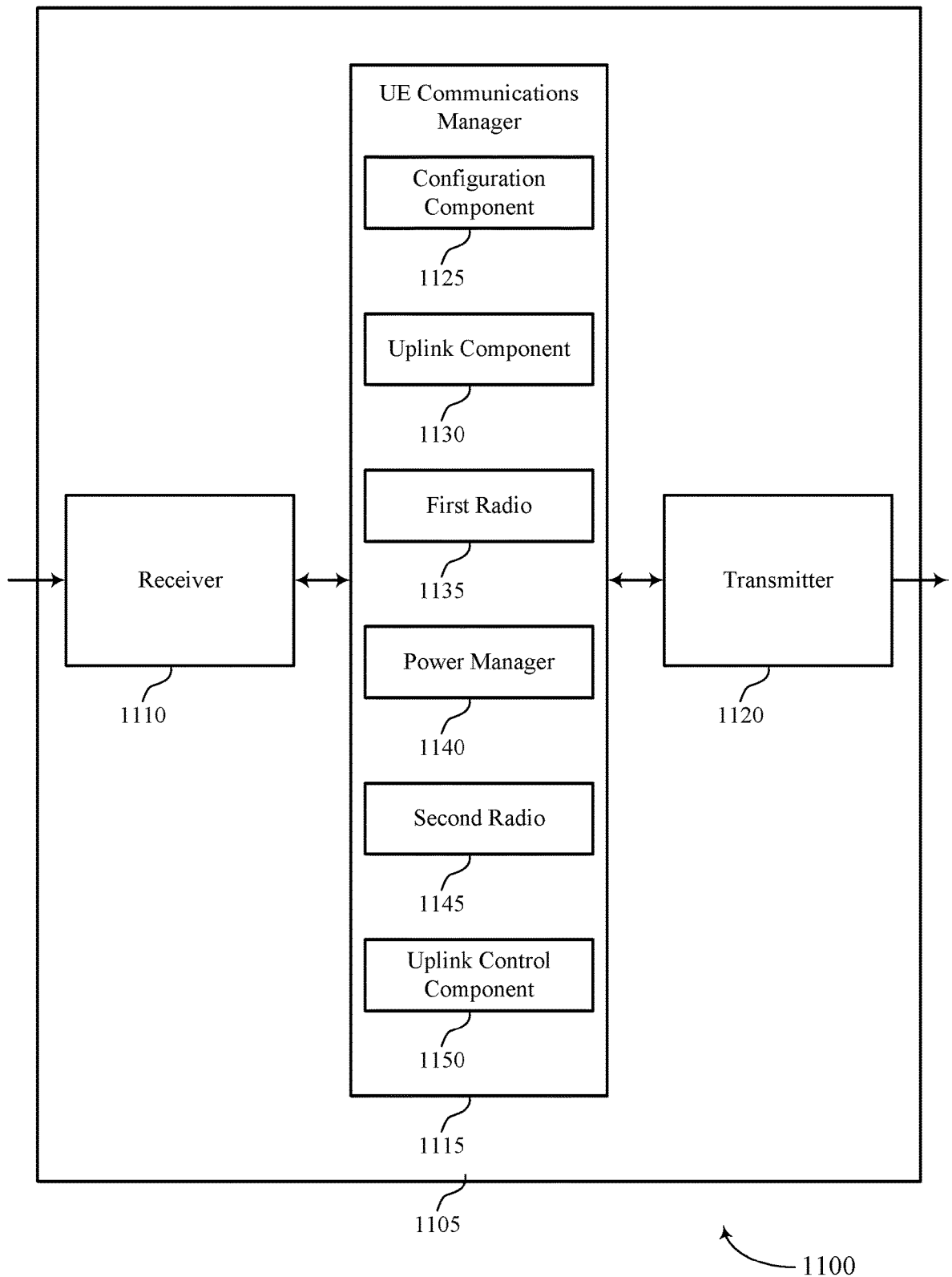

FIG. 11 shows a block diagram 1100 of a wireless device 1105 that supports channel access mechanisms for multi-band operation in accordance with aspects of the present disclosure. Wireless device 1105 may be an example of aspects of a wireless device 1005 or a UE 115 as described with reference to FIG. 10. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to channel access mechanisms for multi-band operation, etc.). Information may be passed on to other components of the device. The receiver 1110 may be an example of aspects of the transceiver 1335 described with reference to FIG. 13. The receiver 1110 may utilize a single antenna or a set of antennas.

In some cases, wireless device 1105 may have a first radio supporting communications via a first frequency band and a second radio supporting communications via a second frequency band. UE communications manager 1115 may be an example of aspects of the UE communications manager 1315 described with reference to FIG. 13. UE communications manager 1115 may also include configuration component 1125, uplink component 1130, first radio 1135, power manager 1140, second radio 1145, and uplink control component 1150.

Configuration component 1125 may receive, via a first communication link in the first frequency band, a configuration for a second communication link in the second frequency band. In some cases, the configuration includes a set of HARQ processes for the second communication link, the downlink transmission being associated with one of the set of HARQ processes. In some cases, the first communication link is established over a licensed channel in the first frequency band and the second communication link is established over an unlicensed frequency channel in the second frequency band or a shared-spectrum channel in the second frequency band. Power manager 1140 may activate the second radio based on the configuration.

Uplink component 1130 may determine whether an uplink for the second communication link can be viably connected or closed. The ability of the UE to close the uplink refers to a determination at the UE that it can support or establish the uplink without violating one or more constraints and to a determination at the UE that it may successfully transmit an uplink transmission to a base station. In some cases, the determining whether the uplink for the second communication link can be viably connected is based on a link budget for the uplink for the second communication link, a power consumption cost for wireless device 1105 of the uplink for the second communication link, a MPE for the uplink for the second communication link, or any combination thereof.

First radio 1135 may receive a preceding downlink transmission over the first communication link and second radio 1145 may receive a downlink transmission over the second communication link. Second radio 1145 may transmit the uplink control information for the downlink transmission over the uplink for the second communication link. In some cases, the downlink transmission starts prior to completion of a channel access procedure for a first frequency channel associated with the preceding downlink transmission. In some cases, the downlink transmission includes downlink control information indicating resources of the downlink transmission associated with a transport block for wireless device 1105. In some cases, the preceding downlink transmission and the downlink transmission are received from respective antenna arrays of a same base station. In some cases, the preceding downlink transmission is received from a first base station and the downlink transmission is received from a second base station.

Uplink control component 1150 may transmit uplink control information for the downlink transmission over the first communication link or over the second communication link based on the determining whether the uplink for the second communication link can be viably connected. For example, uplink control component 1150 may transmit, to a base station associated with the first communication link, the uplink control information for the downlink transmission over the first communication link. In some cases, the uplink control information includes acknowledgement information, link management information, beam management information, or any combination thereof.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
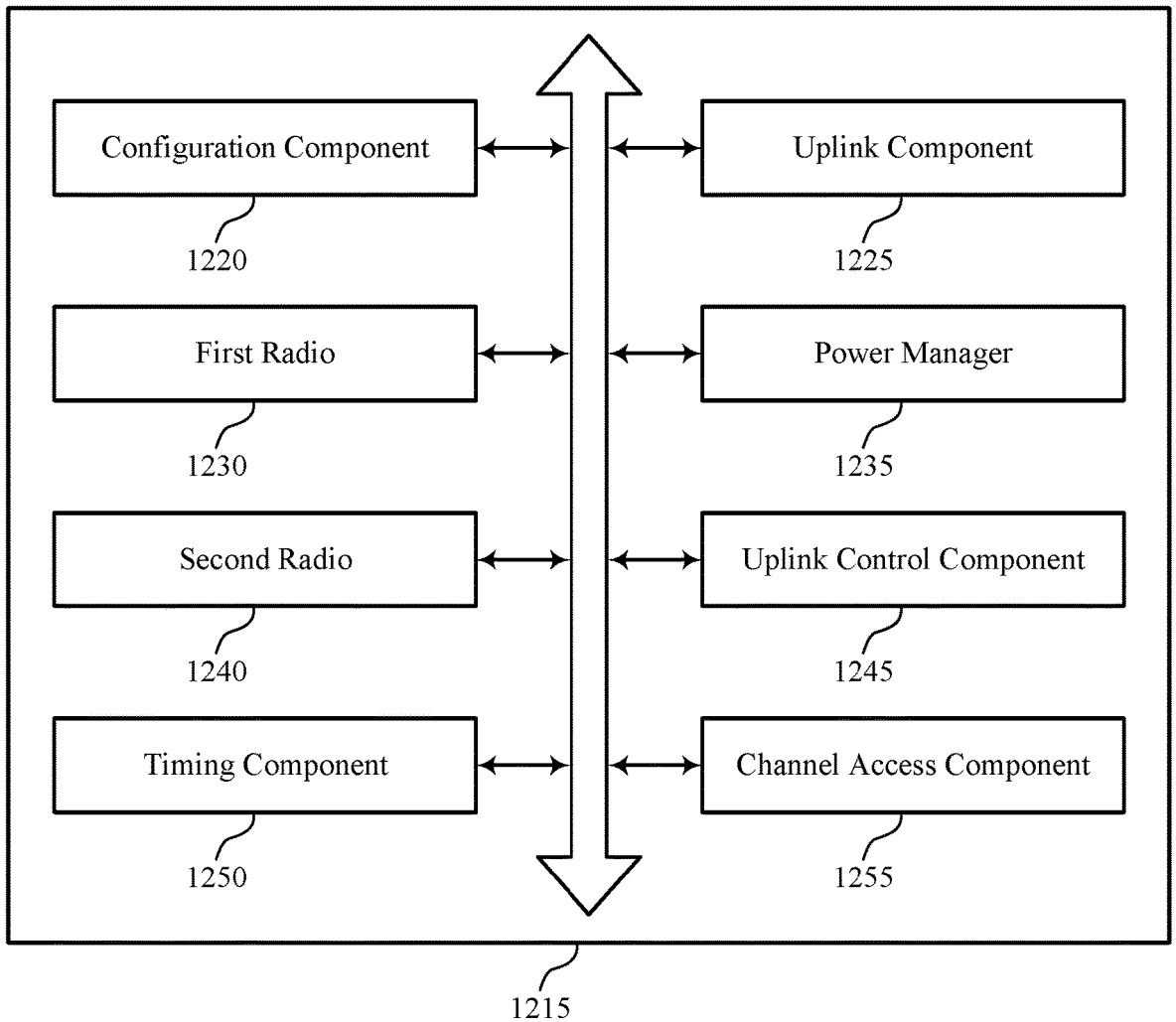

FIG. 12 shows a block diagram 1200 of a UE communications manager 1215 that supports channel access mechanisms for multi-band operation in accordance with aspects of the present disclosure. The UE communications manager 1215 may be an example of aspects of a UE communications manager 1015, a UE communications manager 1115, or a UE communications manager 1315 described with reference to FIGS. 10, 11, and 13. The UE communications manager 1215 may include configuration component 1220, uplink component 1225, first radio 1230, power manager 1235, second radio 1240, uplink control component 1245, timing component 1250, and channel access component 1255. Each of these modules may communicate, directly or indirectly, with one another (e.g., via one or more buses).

Configuration component 1220 may receive, via a first communication link in the first frequency band, a configuration for a second communication link in the second frequency band. In some cases, the configuration includes a set of HARQ processes for the second communication link, the downlink transmission being associated with one of the set of HARQ processes. In some cases, the first communication link is established over a licensed channel in the first frequency band and the second communication link is established over an unlicensed frequency channel in the second frequency band or a shared-spectrum channel in the second frequency band. Power manager 1235 may activate the second radio based on the configuration.

Uplink component 1225 may determine whether an uplink for the second communication link can be viably connected. In some cases, the determining whether the uplink for the second communication link can be viably connected is based on a link budget for the uplink for the second communication link, a power consumption cost for the UE of the uplink for the second communication link, a MPE for the uplink for the second communication link, or any combination thereof.

First radio 1230 may receive a preceding downlink transmission over the first communication link and second radio 1240 may receive a downlink transmission over the second communication link. Second radio 1240 may transmit the uplink control information for the downlink transmission over the uplink for the second communication link. In some cases, the downlink transmission starts prior to completion of a channel access procedure for a first frequency channel associated with the preceding downlink transmission. In some cases, the downlink transmission includes downlink control information indicating resources of the downlink transmission associated with a transport block for the UE. In some cases, the preceding downlink transmission and the downlink transmission are received from respective antenna arrays of a same base station. In some cases, the preceding downlink transmission is received from a first base station and the downlink transmission is received from a second base station.

Uplink control component 1245 may transmit uplink control information for the downlink transmission over the first communication link or over the second communication link based on the determining whether the uplink for the second communication link can be viably connected. For example, uplink control component 1245 may transmit, to a base station associated with the first communication link, the uplink control information for the downlink transmission over the first communication link. In some cases, the uplink control information includes acknowledgement information, link management information, beam management information, or any combination thereof.

Timing component 1250 may identify a timing offset between the preceding downlink transmission and the downlink transmission based on the configuration, where the activating the second radio for the downlink transmission is based on the timing offset.

Channel access component 1255 may receive, from a base station, an RRQ over the first communication link, where the RRQ indicates reservation of a first frequency channel for use by the first communication link. Channel access component 1255 may transmit, to the base station, an RRS over the first communication link, where the preceding downlink transmission is received from the base station based on the RRS. In some cases, the RRQ indicates a set of UEs to be scheduled on the second communication link, the set of UEs including the UE. In some cases, the RRQ indicates a timing offset between the preceding downlink transmission and the downlink transmission, and the second radio for the downlink transmission is activated based on the timing offset. In some cases, the RRS indicates whether the UE can viably connect the uplink for the second communication link.

Figure 13:
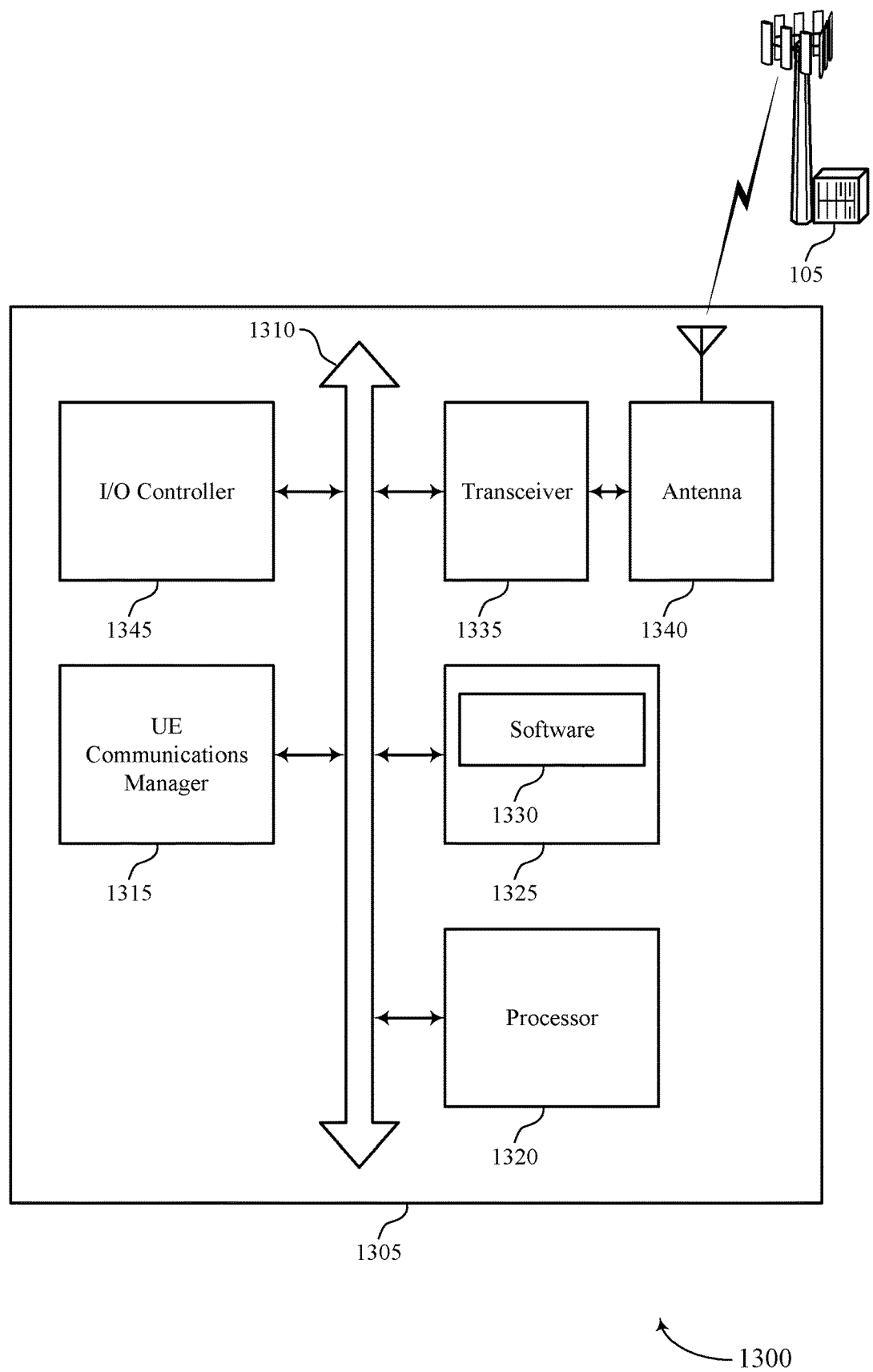
FIG. 13 illustrates a block diagram of a system including a UE that supports channel access mechanisms for multi-band operation in accordance with aspects of the present disclosure.

FIG. 13 shows a diagram of a system 1300 including a device 1305 that supports channel access mechanisms for multi-band operation in accordance with aspects of the present disclosure. Device 1305 may be an example of or include the components of wireless device 1005, wireless device 1105, or a UE 115 as described above, e.g., with reference to FIGS. 10 and 11. Device 1305 may include components for bi-directional voice and data communications including components for transmitting and receiving communications, including UE communications manager 1315, processor 1320, memory 1325, software 1330, transceiver 1335, antenna 1340, and I/O controller 1345. These components may be in electronic communication via one or more buses (e.g., bus 1310). Device 1305 may communicate wirelessly with one or more base stations 105.

Processor 1320 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting channel access mechanisms for multi-band operation).

Memory 1325 may include random access memory (RAM) and read only memory (ROM). The memory 1325 may store computer-readable, computer-executable software 1330 including instructions that, when executed, cause the processor to perform various functions described herein. In some cases, the memory 1325 may contain, among other things, a basic input/output system (BIOS) which may control basic hardware or software operation such as the interaction with peripheral components or devices.

Software 1330 may include code to implement aspects of the present disclosure, including code to support channel access mechanisms for multi-band operation. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas. In some cases, the wireless device may include a single antenna 1340. However, in some cases the device may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some cases, I/O controller 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system. In other cases, I/O controller 1345 may represent or interact with a modem, a keyboard, a mouse, a touchscreen, or a similar device. In some cases, I/O controller 1345 may be implemented as part of a processor. In some cases, a user may interact with device 1305 via I/O controller 1345 or via hardware components controlled by I/O controller 1345.

Figure 14:
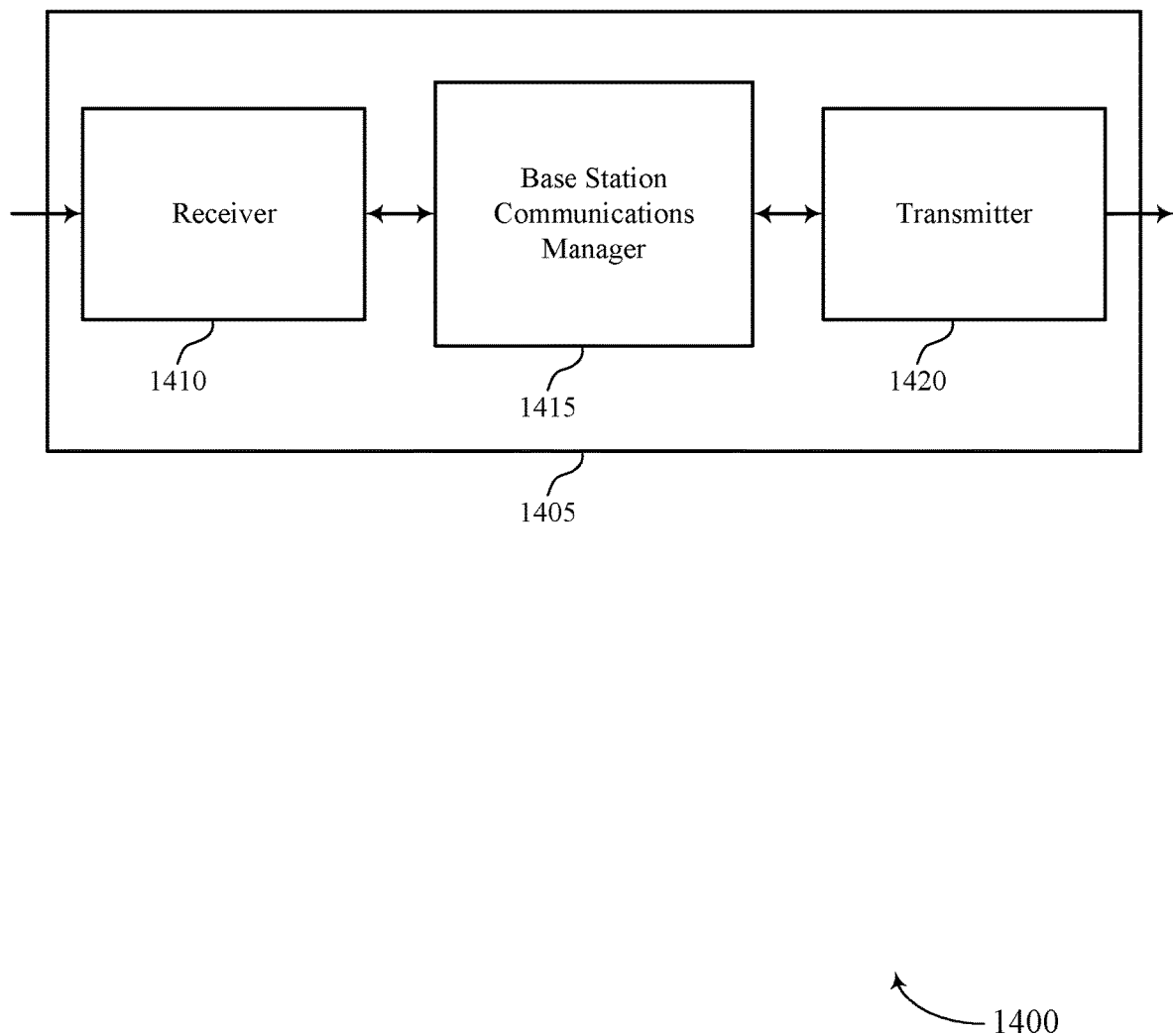
FIGS. 14 through 16 show block diagrams of a device that supports channel access mechanisms for multi-band operation in accordance with aspects of the present disclosure.

FIG. 14 shows a block diagram 1400 of a wireless device 1405 that supports channel access mechanisms for multi-band operation in accordance with aspects of the present disclosure. Wireless device 1405 may be an example of aspects of a base station 105 as described herein. Wireless device 1405 may include receiver 1410, base station communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to channel access mechanisms for multi-band operation, etc.). Information may be passed on to other components of the device. The receiver 1410 may be an example of aspects of the transceiver 1735 described with reference to FIG. 17. The receiver 1410 may utilize a single antenna or a set of antennas.

Base station communications manager 1415 may be an example of aspects of the base station communications manager 1715 described with reference to FIG. 17. Base station communications manager 1415 and/or at least some of its various sub-components may be implemented in hardware, software executed by a processor, firmware, or any combination thereof. If implemented in software executed by a processor, the functions of the base station communications manager 1415 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1415 and/or at least some of its various sub-components may be physically located at various positions, including being distributed such that portions of functions are implemented at different physical locations by one or more physical devices. In some examples, base station communications manager 1415 and/or at least some of its various sub-components may be a separate and distinct component in accordance with various aspects of the present disclosure. In other examples, base station communications manager 1415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1415 may determine, based on a first channel access procedure, that a first frequency channel of a first frequency band is available for use by a first communication link to a UE. Base station communications manager 1415 may transmit a preceding downlink transmission via the first communication link to the UE, the preceding downlink transmission activating a second communication link over a second frequency channel of a second frequency band. Base station communications manager 1415 may receive an indication from the UE that indicates whether the UE can viably connect an uplink for the second communication link. Base station communications manager 1415 may transmit a downlink transmission over the second communication link. Base station communications manager 1415 may receive uplink control information for the downlink transmission over an uplink for the first communication link or the uplink for the second communication link based on the indication.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1735 described with reference to FIG. 17. The transmitter 1420 may utilize a single antenna or a set of antennas.

Figure 15:
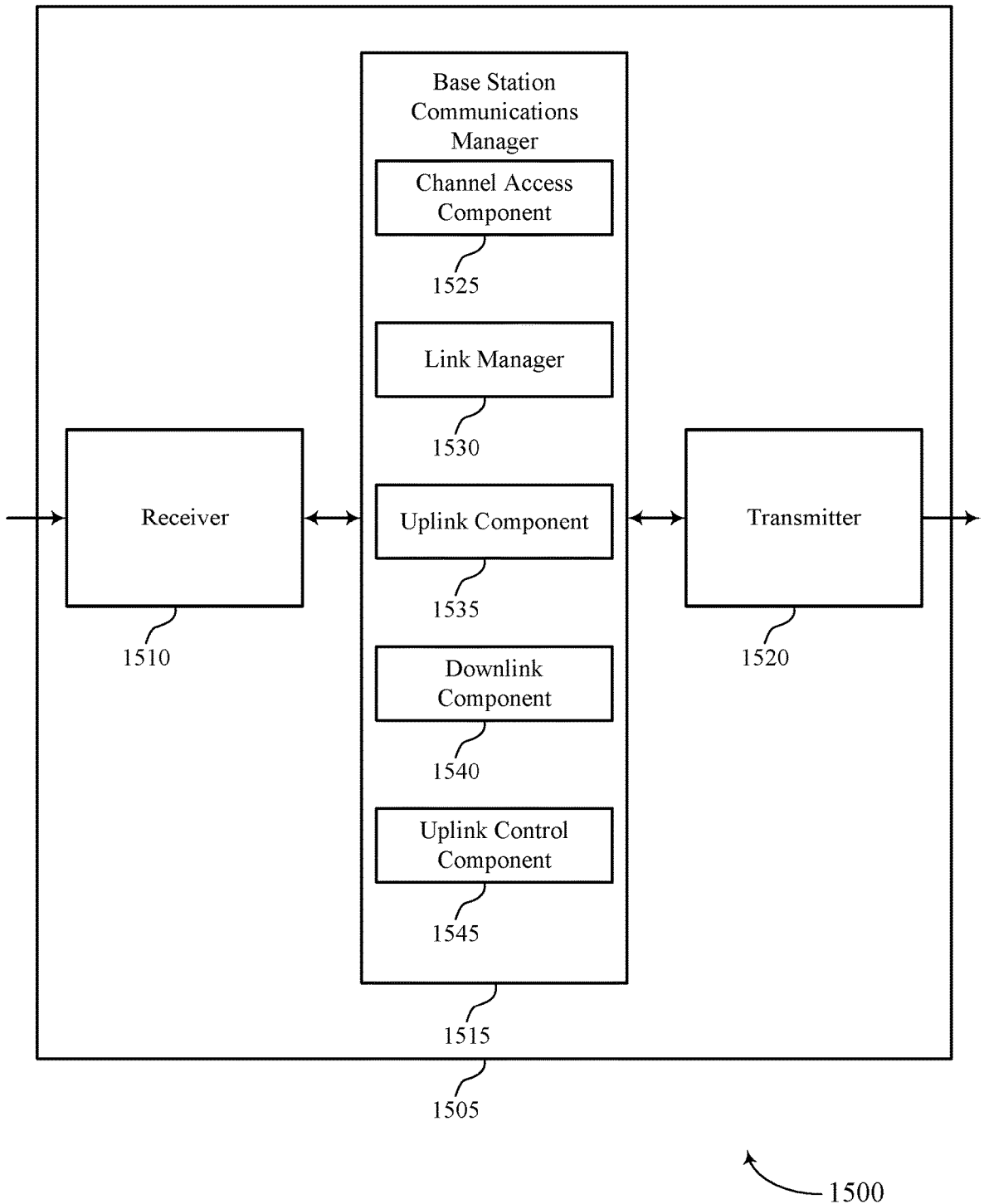

FIG. 15 shows a block diagram 1500 of a wireless device 1505 that supports channel access mechanisms for multi-band operation in accordance with aspects of the present disclosure. Wireless device 1505 may be an example of aspects of a wireless device 1405 or a base station 105 as described with reference to FIG. 14. Wireless device 1505 may include receiver 1510, base station communications manager 1515, and transmitter 1520. Wireless device 1505 may also include a processor. Each of these components may be in communication with one another (e.g., via one or more buses).

Receiver 1510 may receive information such as packets, user data, or control information associated with various information channels (e.g., control channels, data channels, and information related to channel access mechanisms for multi-band operation, etc.). Information may be passed on to other components of the device. The receiver 1510 may be an example of aspects of the transceiver 1735 described with reference to FIG. 17. The receiver 1510 may utilize a single antenna or a set of antennas.

Base station communications manager 1515 may be an example of aspects of the base station communications manager 1715 described with reference to FIG. 17. Base station communications manager 1515 may also include channel access component 1525, link manager 1530, uplink component 1535, downlink component 1540, and uplink control component 1545.

Channel access component 1525 may determine, based on a first channel access procedure, that a first frequency channel of a first frequency band is available for use by a first communication link to a UE. Channel access component 1525 may determine that the second frequency channel is available based on a second channel access procedure for the second frequency channel at the timing offset. Channel access component 1525 may transmit, to a UE, an RRQ over the first communication link, where the RRQ indicates reservation of the first frequency channel by a base station. Channel access component 1525 may receive, from the UE, an RRS over the first communication link, where the preceding downlink transmission is transmitted from the base station based on the RRS. In some cases, the RRQ indicates a set of UEs to be scheduled on the second communication link, the set of UEs including the UE. In some cases, the RRQ indicates a timing offset between the preceding downlink transmission and the downlink transmission. In some cases, the RRS indicates whether the UE can viably connect the uplink for the second communication link.

Link manager 1530 may transmit a preceding downlink transmission via the first communication link to the UE, the preceding downlink transmission activating a second communication link over a second frequency channel of a second frequency band. In some cases, the first frequency channel is a licensed frequency channel and the second frequency channel is an unlicensed frequency channel or a shared-spectrum frequency channel. In some cases, the preceding downlink transmission and the downlink transmission are transmitted from respective antenna arrays of a same base station. In some cases, the preceding downlink transmission is transmitted from a first base station and the downlink transmission is transmitted from a second base station.

Uplink component 1535 may receive an indication from the UE that indicates whether the UE can viably connect an uplink for the second communication link. Uplink component 1535 may monitor for HARQ acknowledgement from the UE for the set of downlink transmissions, where transmission to the UE over the downlink for the second communication link is suspended until the HARQ acknowledgement is received. Uplink component 1535 may receive a second indication from the UE that indicates that the UE can viably connect the uplink for the second communication link.

Downlink component 1540 may transmit a downlink transmission over the second communication link. Downlink component 1540 may transmit a set of downlink transmissions over the downlink for the second communication link, the set of downlink transmissions corresponding to the number of HARQ processes. Downlink component 1540 may transmit a third downlink transmission over the second communication link. In some cases, the downlink transmission is asynchronous to the preceding downlink transmission.

Uplink control component 1545 may receive uplink control information for the downlink transmission over an uplink for the first communication link or the uplink for the second communication link based on the indication. Uplink control component 1545 may configure the UE with a number of HARQ processes for a downlink for the second communication link. Uplink control component 1545 may receive the uplink control information for the downlink transmission over the uplink for the first communication link. Uplink control component 1545 may receive, from the UE, uplink control information for the third downlink transmission via the uplink for the second communication link.

Transmitter 1520 may transmit signals generated by other components of the device. In some examples, the transmitter 1520 may be collocated with a receiver 1510 in a transceiver module. For example, the transmitter 1520 may be an example of aspects of the transceiver 1735 described with reference to FIG. 17. The transmitter 1520 may utilize a single antenna or a set of antennas.

Figure 16:
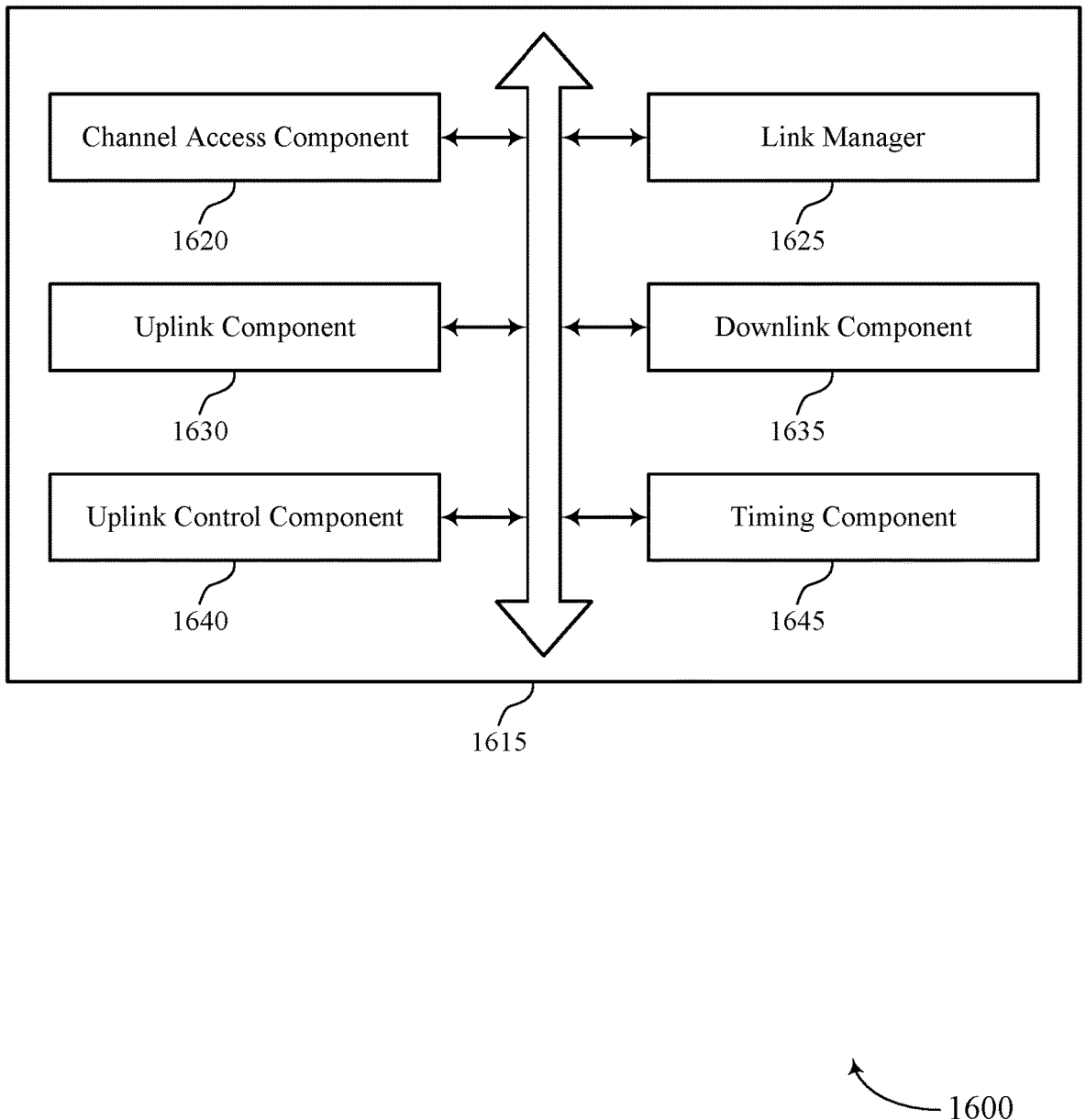

FIG. 16 shows a block diagram 1600 of a base station communications manager 1615 that supports channel access mechanisms for multi-band operation in accordance with aspects of the present disclosure. The base station communications manager 1615 may be an example of aspects of a base station communications manager 1715 described with reference to FIGS. 14, 15, and 17. The base station communications manager 1615 may include channel access component 1620, link manager 1625, uplink component 1630, downlink component 1635, uplink control component 1640, and timing component 1645. Each of these modules may communicate, directly or indirectly, with one another (e.g., via one or more buses).

Channel access component 1620 may determine, based on a first channel access procedure, that a first frequency channel of a first frequency band is available for use by a first communication link to a UE. Channel access component 1620 may determine that the second frequency channel is available based on a second channel access procedure for the second frequency channel at the timing offset. Channel access component 1620 may transmit, to a UE, an RRQ over the first communication link, where the RRQ indicates reservation of the first frequency channel by a base station. Channel access component 1620 may receive, from the UE, an RRS over the first communication link, where the preceding downlink transmission is transmitted from the base station based on the RRS. In some cases, the RRQ indicates a set of UEs to be scheduled on the second communication link, the set of UEs including the UE. In some cases, the RRQ indicates a timing offset between the preceding downlink transmission and the downlink transmission. In some cases, the RRS indicates whether the UE can viably connect the uplink for the second communication link.

Link manager 1625 may transmit a preceding downlink transmission via the first communication link to the UE, the preceding downlink transmission activating a second communication link over a second frequency channel of a second frequency band. In some cases, the first frequency channel includes a licensed frequency channel and the second frequency channel includes an unlicensed frequency channel or a shared-spectrum frequency channel. In some cases, the preceding downlink transmission and the downlink transmission are transmitted from respective antenna arrays of a same base station. In some cases, the preceding downlink transmission is transmitted from a first base station and the downlink transmission is transmitted from a second base station.

Uplink component 1630 may receive an indication from the UE that indicates whether the UE can viably connect or close an uplink for the second communication link. Uplink component 1630 may monitor for HARQ acknowledgement from the UE for the set of downlink transmissions, where transmission to the UE over the downlink for the second communication link is suspended until the HARQ acknowledgement is received. Uplink component 1630 may receive a second indication from the UE that indicates that the UE can viably connect or close the uplink for the second communication link. The ability of the UE to close the uplink refers to a determination at the UE that it can support the uplink without violating one or more constraints and to a determination at the UE that it may successfully transmit an uplink transmission to a base station. The terms viably connect and close ae used interchangeably herein.

Downlink component 1635 may transmit a downlink transmission over the second communication link. Downlink component 1635 may transmit a set of downlink transmissions over the downlink for the second communication link, the set of downlink transmissions corresponding to the number of HARQ processes. Downlink component 1635 may transmit a third downlink transmission over the second communication link. In some cases, the downlink transmission is asynchronous to the preceding downlink transmission.

Uplink control component 1640 may receive uplink control information for the downlink transmission over an uplink for the first communication link or the uplink for the second communication link based on the indication. Uplink control component 1640 may configure the UE with a number of HARQ processes for a downlink for the second communication link. Uplink control component 1640 may receive the uplink control information for the downlink transmission over the uplink for the first communication link. Uplink control component 1640 may receive, from the UE, uplink control information for the third downlink transmission via the uplink for the second communication link.

Timing component 1645 may identify a timing offset between the preceding downlink transmission and the downlink transmission, where the downlink transmission is transmitted based on the timing offset.

Figure 17:
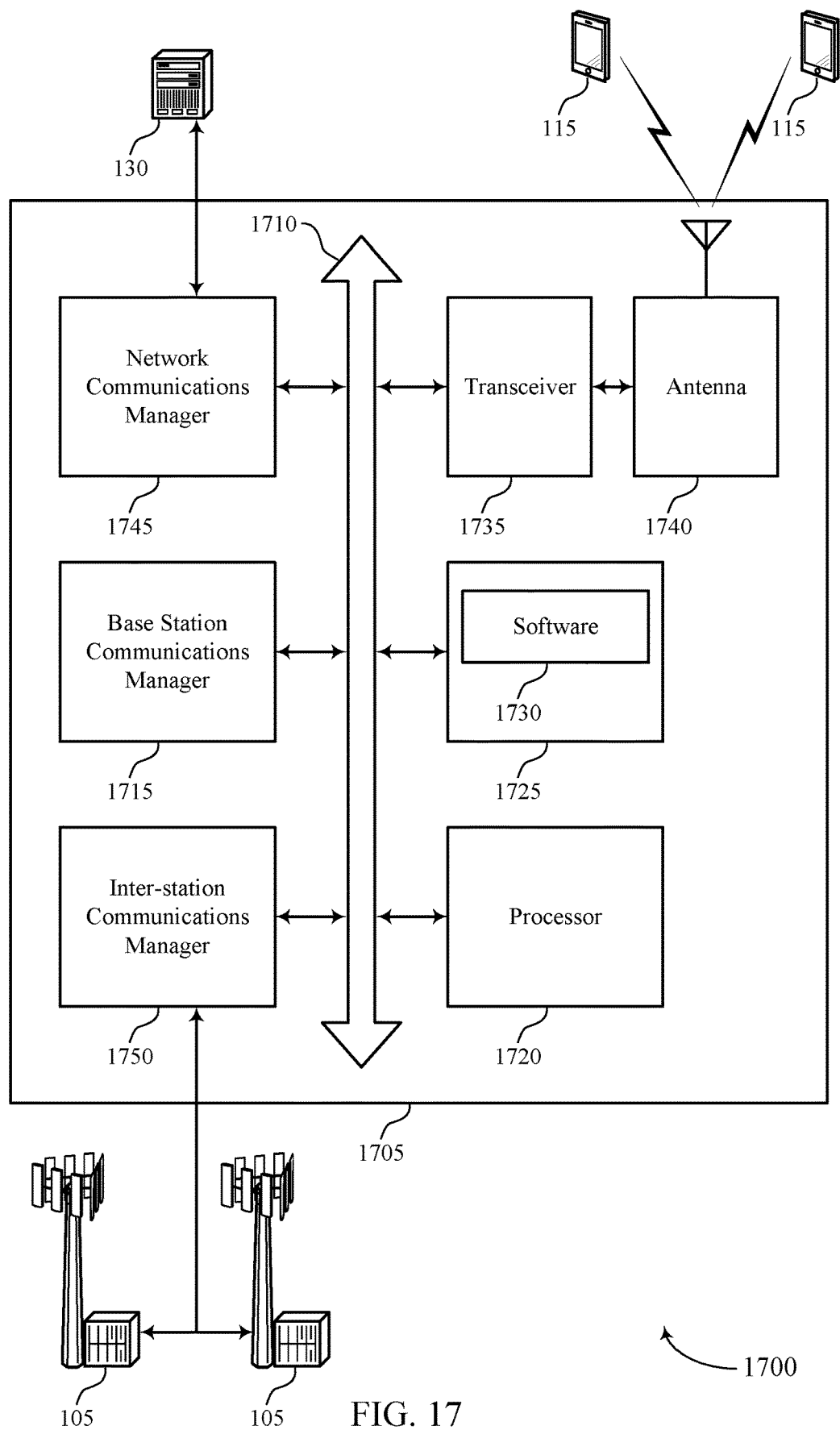
FIG. 17 illustrates a block diagram of a system including a base station that supports channel access mechanisms for multi-band operation in accordance with aspects of the present disclosure.

FIG. 17 shows a diagram of a system 1700 including a device 1705 that supports channel access mechanisms for multi-band operation in accordance with aspects of the present disclosure. Device 1705 may be an example of or include the components of base station 105 as described above, e.g., with reference to FIG. 1. Device 1705 may include components for bi-directional voice and data communications including components for transmitting and receiving communications, including base station communications manager 1715, processor 1720, memory 1725, software 1730, transceiver 1735, antenna 1740, network communications manager 1745, and inter-station communications manager 1750. These components may be in electronic communication via one or more buses (e.g., bus 1710). Device 1705 may communicate wirelessly with one or more UEs 115.

Processor 1720 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1720 may be configured to operate a memory array using a memory controller. In other cases, a memory controller may be integrated into processor 1720. Processor 1720 may be configured to execute computer-readable instructions stored in a memory to perform various functions (e.g., functions or tasks supporting channel access mechanisms for multi-band operation).

Memory 1725 may include RAM and ROM. The memory 1725 may store computer-readable, computer-executable software 1730 including instructions that, when executed, cause the processor to perform various functions described herein. In some cases, the memory 1725 may contain, among other things, a BIOS which may control basic hardware or software operation such as the interaction with peripheral components or devices.

Software 1730 may include code to implement aspects of the present disclosure, including code to support channel access mechanisms for multi-band operation. Software 1730 may be stored in a non-transitory computer-readable medium such as system memory or other memory. In some cases, the software 1730 may not be directly executable by the processor but may cause a computer (e.g., when compiled and executed) to perform functions described herein.

Transceiver 1735 may communicate bi-directionally, via one or more antennas, wired, or wireless links as described above. For example, the transceiver 1735 may represent a wireless transceiver and may communicate bi-directionally with another wireless transceiver. The transceiver 1735 may also include a modem to modulate the packets and provide the modulated packets to the antennas for transmission, and to demodulate packets received from the antennas. In some cases, the wireless device may include a single antenna 1740. However, in some cases the device may have more than one antenna 1740, which may be capable of concurrently transmitting or receiving multiple wireless transmissions.

Network communications manager 1745 may manage communications with the core network 130 (e.g., via one or more wired backhaul links). For example, the network communications manager 1745 may manage the transfer of data communications for client devices, such as one or more UEs 115.

Inter-station communications manager 1750 may manage communications with other base station 105 and may include a controller or scheduler for controlling communications with UEs 115 in cooperation with other base stations 105. For example, the inter-station communications manager 1750 may coordinate scheduling for transmissions to UEs 115 for various interference mitigation techniques such as beamforming or joint transmission. In some examples, inter-station communications manager 1750 may provide an X2 interface within a Long Term Evolution (LTE)/LTE-A wireless communication network technology to provide communication between base stations 105.

Figure 18:
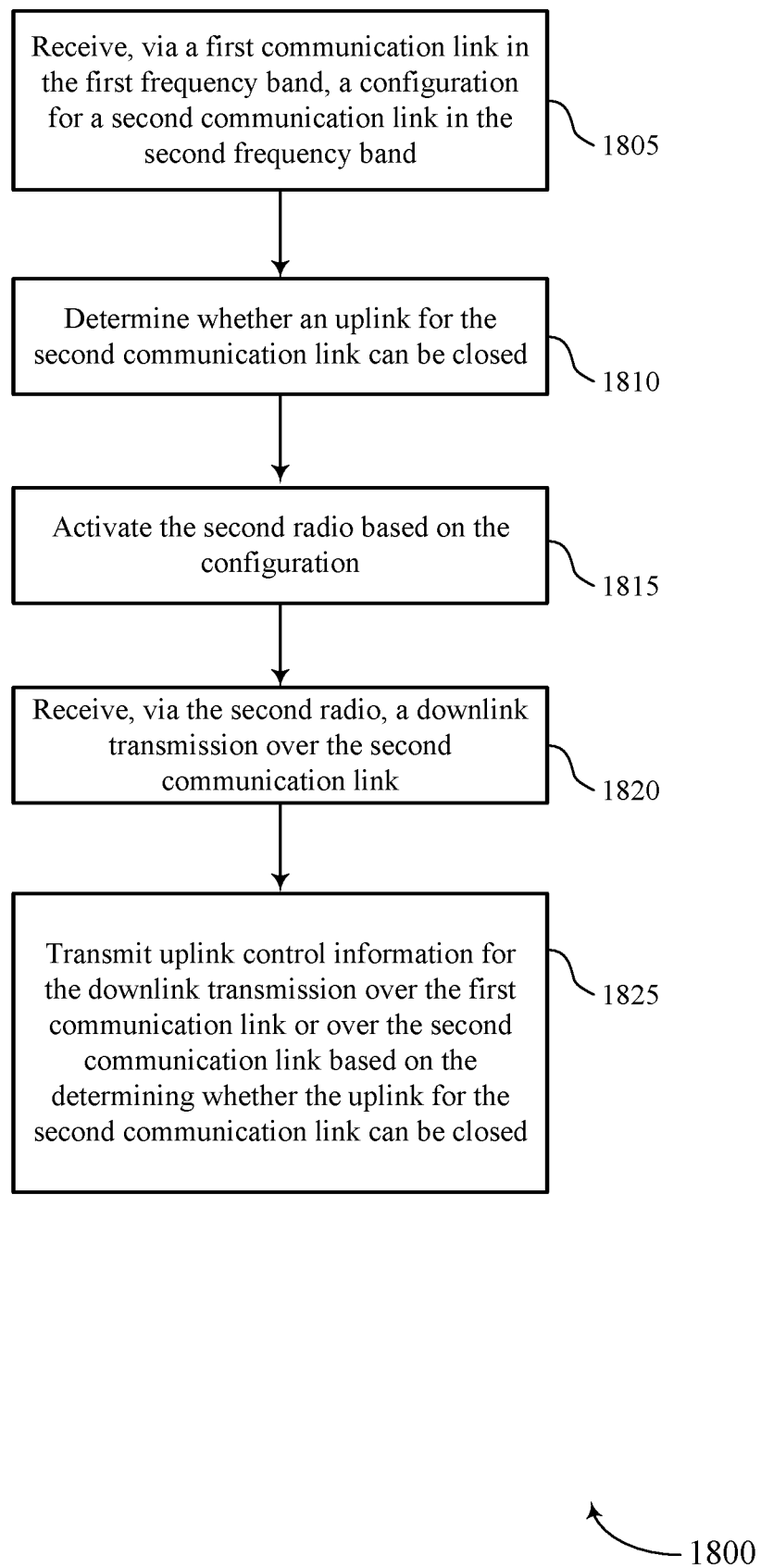
FIGS. 18 through 20 illustrate methods for channel access mechanisms for multi-band operation in accordance with aspects of the present disclosure.

FIG. 18 shows a flowchart illustrating a method 1800 for channel access mechanisms for multi-band operation in accordance with aspects of the present disclosure. The operations of method 1800 may be implemented by a UE 115 or its components as described herein. In some cases, the UE 115 has a first radio supporting communications via a first frequency band and a second radio supporting communications via a second frequency band. For example, the operations of method 1800 may be performed by a UE communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may receive, via a first communication link in the first frequency band, a configuration for a second communication link in the second frequency band. In some examples, the first communication link may be a low-band communication link and the second communication link may be a high-band communication link. The operations of block 1805 may be performed according to the methods described herein. In certain examples, aspects of the operations of block 1805 may be performed by a configuration component as described with reference to FIGS. 10 through 13.

At block 1810 the UE 115 may determine whether an uplink for the second communication link can be viably connected or closed. As discussed with reference to FIG. 6, in some cases, the availability of ACK opportunities (e.g., which may alternatively be referred to as uplink control opportunities) on high-band communication link 605-a may be based at least in part on an ability of a receiving device to viably connect an uplink over the high-band communication link 605-a. For example, a receiving device such as UE 115-a may determine whether it is able to connect an uplink of a high-band communication link 605-a with a serving peripheral base station (e.g., base station 105-b). The ability of the UE to close the uplink refers to a determination at the UE that it can support the uplink without violating one or more constraints and to a determination at the UE that it may successfully transmit an uplink transmission to a base station. The determination may in some cases depend on power constraints of UE 115-a, a distance between the communicating devices, a utilization metric of the channel carrying the high-band communication link 605-a, etc. UE 115-a may indicate (e.g., in an uplink control transmission, an RRS, or some other signaling via low-band communication link 610-a) an ability to close the uplink of the high-band communication link 605-a. If the UE 115-a signals an ability to close the uplink for high-band communication link 605-a, the base stations 105 (e.g., or some other suitable network entity) may schedule uplink resources for UE 115-a over high-band communication link 605-a. The operations of block 1810 may be performed according to the methods described herein. In certain examples, aspects of the operations of block 1810 may be performed by a uplink component as described with reference to FIGS. 10 through 13. In one example, the UE 115 may receive, via the first radio, a preceding downlink transmission over the first communication link. In some examples and with reference to FIG. 4, a target receiving device, such as a UE 115-a, may receive downlink transmission 430-b as discussed in FIG. 4, over a downlink of low-band communication link 410-a. For example, the receiving device may in some cases be equipped with multiple radios and may receive downlink transmission 430-b over a low-band radio while maintaining a high-band radio in an inactive mode (e.g., to conserve energy).

At block 1815 the UE 115 may activate the second radio based at least in part on the configuration. In some examples and with reference to FIG. 4, based on downlink transmission 430-b, the receiving device may accordingly activate the high-band radio to monitor for a subsequent data transmission over high-band communication link 405-a. The operations of block 1815 may be performed according to the methods described herein. In certain examples, aspects of the operations of block 1815 may be performed by a power manager as described with reference to FIGS. 10 through 13.

At block 1820 the UE 115 may receive, via the second radio, a downlink transmission over the second communication link. In some cases, and with reference to FIG. 4, the timing offset 415-a may be UE-specific (e.g., may be determined according to a UE capability or UE configuration message) or may be specific to a given cell associated with high-band communication link 405-a (e.g., or a cell associated with low-band communication link 410-a). Based on timing offset 415-a, the UE may receive downlink transmission 430-a over high-band communication link 405-a. The operations of block 1820 may be performed according to the methods described herein. In certain examples, aspects of the operations of block 1820 may be performed by a second radio as described with reference to FIGS. 10 through 13.

At block 1825 the UE 115 may transmit uplink control information for the downlink transmission over the first communication link or over the second communication link based at least in part on the determining whether the uplink for the second communication link can be viably connected. In some examples and with reference to FIG. 4, the receiving device may subsequently transmit uplink control 435-a (e.g., which may include acknowledgement information, beam management information, link management information, some combination thereof, etc.) over the low-band communication link 410-a. Uplink control 435-a may contain respective acknowledgement information for downlink transmissions 430-a, 430-b. Because uplink control 435-a is transmitted over low-band communication link 410-a, it may be received by the first base station (e.g., which may correspond to base station 105-a). The operations of block 1830 may be performed according to the methods described herein. In certain examples, aspects of the operations of block 1825 may be performed by an uplink control component as described with reference to FIGS. 10 through 13.

Figure 19:
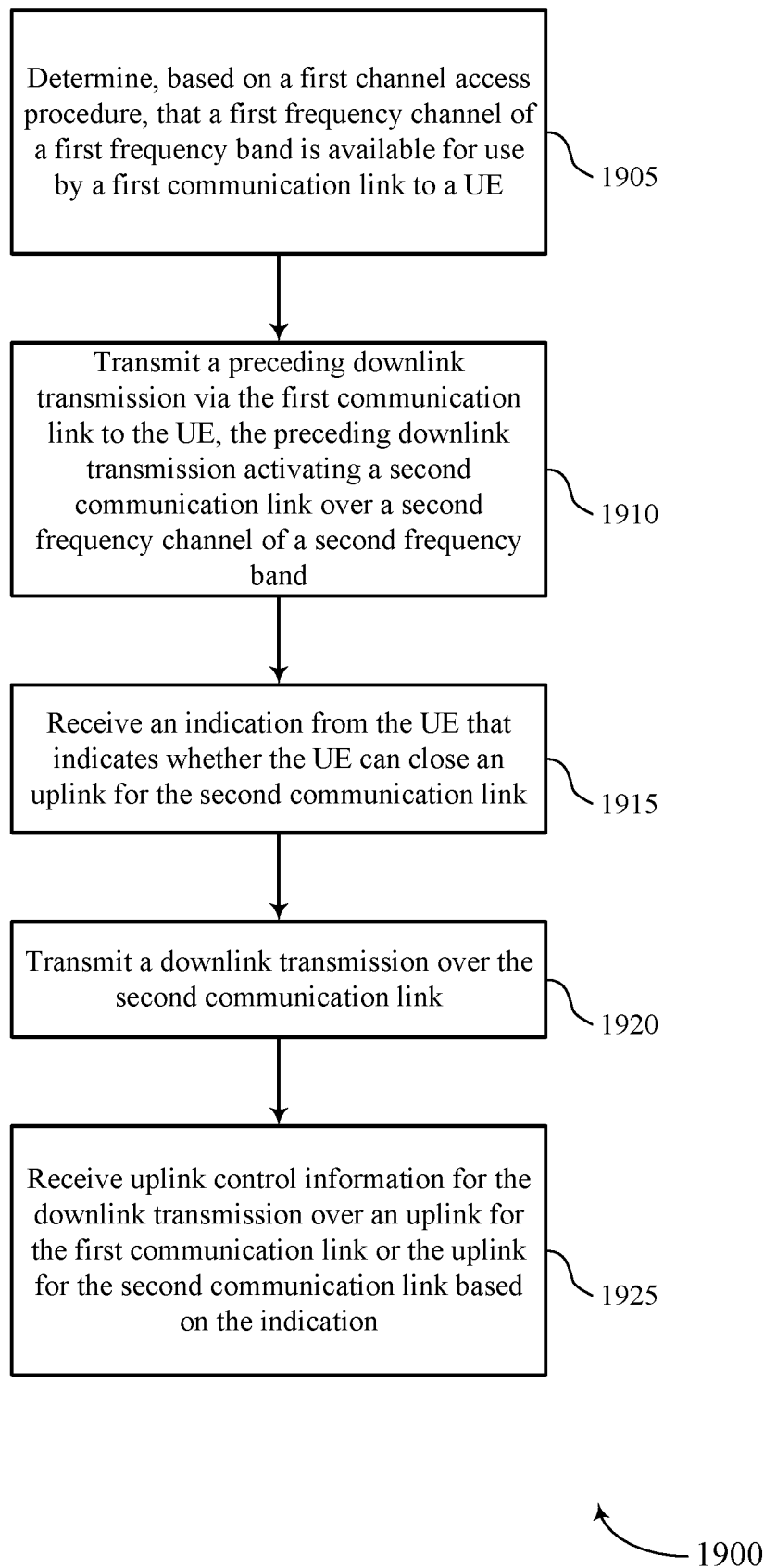

FIG. 19 shows a flowchart illustrating a method 1900 for channel access mechanisms for multi-band operation in accordance with aspects of the present disclosure. The operations of method 1900 may be implemented by a base station 105 or its components as described herein. For example, the operations of method 1900 may be performed by a base station communications manager as described with reference to FIGS. 14 through 17. In some examples, a base station 105 may execute a set of codes to control the functional elements of the device to perform the functions described below. Additionally or alternatively, the base station 105 may perform aspects of the functions described below using special-purpose hardware.

At block 1905 the base station 105 may determine, based at least in part on a first channel access procedure, that a first frequency channel of a first frequency band is available for use by a first communication link to a user equipment (UE). In some examples, a base station may perform a CCA (e.g., a CAT 4 LBT) to determine an availability of a low-band channel. That is, the low-band channel may be an example of an unlicensed or shared channel such that the base station may perform collision avoidance techniques. The operations of block 1905 may be performed according to the methods described herein. In certain examples, aspects of the operations of block 1905 may be performed by a channel access component as described with reference to FIGS. 14 through 17.

At block 1910 the base station 105 may transmit a preceding downlink transmission via the first communication link to the UE, the preceding downlink transmission activating a second communication link over a second frequency channel of a second frequency band. In some examples, upon detecting an idle medium, a base station 105-d may transmit a low-band downlink transmission via a low-band communication link. For example, the downlink transmission may contain scheduling information (e.g., and in some cases data). In some cases, the low-band downlink transmission may be received by UE 115-b and base station 105-c. The operations of block 1910 may be performed according to the methods described herein. In certain examples, aspects of the operations of block 1910 may be performed by a link manager as described with reference to FIGS. 14 through 17.

At block 1915 the base station 105 may receive an indication from the UE that indicates whether the UE can viably connect an uplink for the second communication link. As previously discussed and with reference to FIG. 6, in some cases, the availability of ACK opportunities (e.g., which may alternatively be referred to as uplink control opportunities) on high-band communication link 605-a may be based at least in part on an ability of a UE to viably connect an uplink over the high-band communication link 605-a. For example, a receiving device such as UE 115-a may determine whether it is able to viably connect an uplink of a high-band communication link 605-a with a serving peripheral base station (e.g., base station 105-b). The ability of the UE to viably connected the uplink refers to a determination at the UE that it can support the uplink without violating one or more constraints. The determination may in some cases depend on power constraints of UE 115-a, a distance between the communicating devices, a utilization metric of the channel carrying the high-band communication link 605-a, etc. UE 115-a may indicate (e.g., in an uplink control transmission, an RRS, or some other signaling via low-band communication link 610-a) an ability to viably connect the uplink of the high-band communication link 605-a. If the UE 115-a signals an ability to viably connect the uplink for high-band communication link 605-a, the base stations 105 (e.g., or some other suitable network entity) may schedule uplink resources for UE 115-a over high-band communication link 605-a. The operations of block 1915 may be performed according to the methods described herein. In certain examples, aspects of the operations of block 1915 may be performed by an uplink component as described with reference to FIGS. 14 through 17.

At block 1920 the base station 105 may transmit a downlink transmission over the second communication link. In some cases, and with reference to FIG. 4, the timing offset 415-a may be UE-specific (e.g., may be determined according to a UE capability or UE configuration message) or may be specific to a given cell associated with high-band communication link 405-a (e.g., or a cell associated with low-band communication link 410-a). Based on timing offset 415-a, the base station may transmit downlink transmission 430-a over high-band communication link 405-a. The operations of block 1920 may be performed according to the methods described herein. In certain examples, aspects of the operations of block 1920 may be performed by a downlink component as described with reference to FIGS. 14 through 17.

At block 1925 the base station 105 may receive uplink control information for the downlink transmission over an uplink for the first communication link or the uplink for the second communication link based at least in part on the indication. In some examples and with reference to FIG. 4, the base station may receive uplink control 435-a (e.g., which may include acknowledgement information, beam management information, link management information, some combination thereof, etc.) over the low-band communication link 410-a. Uplink control 435-a may contain respective acknowledgement information for downlink transmissions 430-a, 430-b. Because uplink control 435-a is received over low-band communication link 410-a, it may be transmitted by the first base station (e.g., which may correspond to base station 105-a). The operations of block 1925 may be performed according to the methods described herein. In certain examples, aspects of the operations of block 1925 may be performed by an uplink control component as described with reference to FIGS. 14 through 17.

Figure 20:
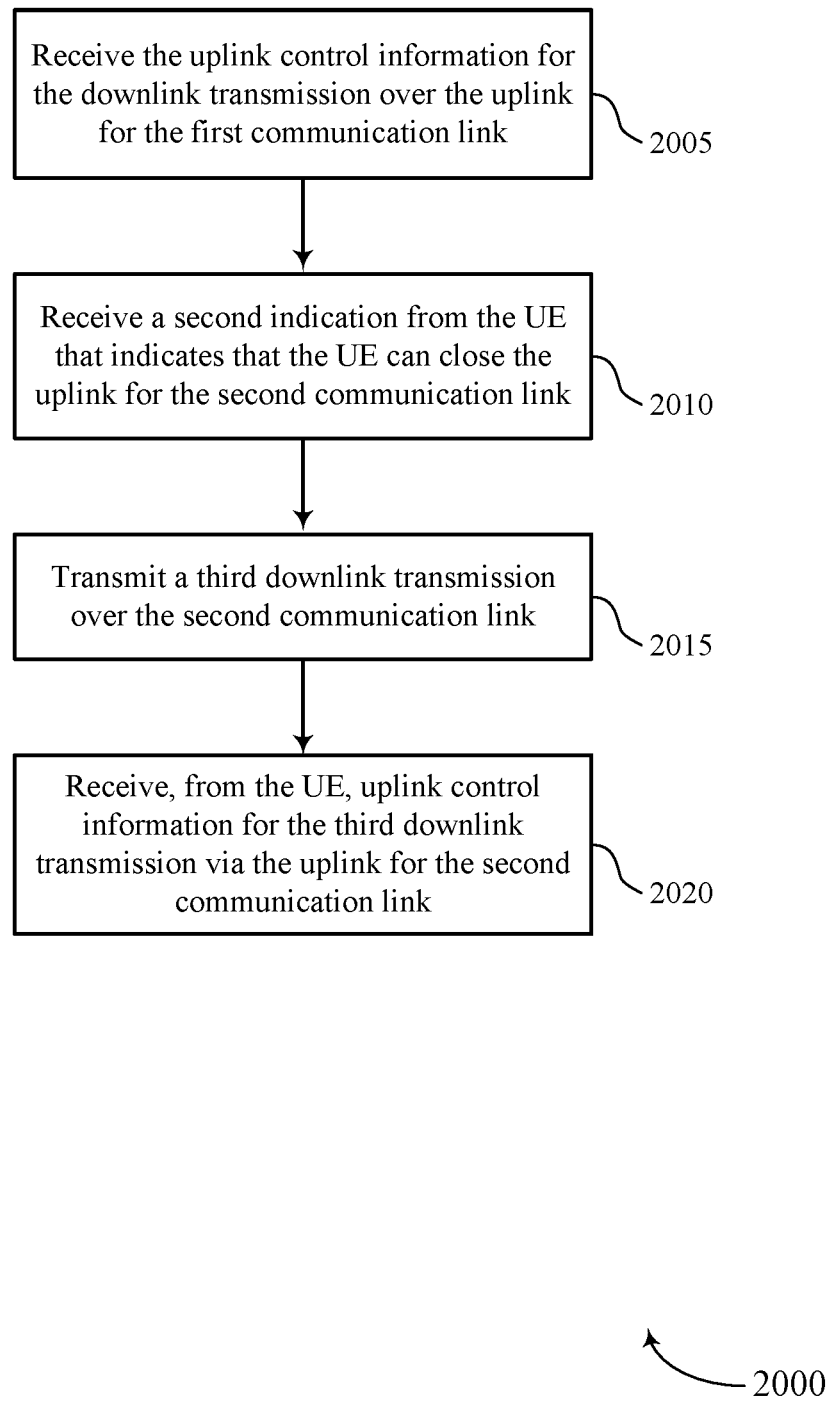

FIG. 20 shows a flowchart illustrating a method 2000 for channel access mechanisms for multi-band operation in accordance with aspects of the present disclosure. The operations of method 2000 may be implemented by a base station 105 or its components as described herein. For example, the operations of method 2000 may be performed by a base station communications manager as described with reference to FIGS. 14 through 17. In some examples, a base station 105 may execute a set of codes to control the functional elements of the device to perform the functions described below. Additionally or alternatively, the base station 105 may perform aspects of the functions described below using special-purpose hardware.

At block 2005 the base station 105 may receive the uplink control information for the downlink transmission over the uplink for the first communication link. In some cases, the uplink control information includes acknowledgement information, link management information, beam management information, or any combination thereof. The operations of block 2005 may be performed according to the methods described herein. In certain examples, aspects of the operations of block 2005 may be performed by an uplink control component as described with reference to FIGS. 14 through 17.

At block 2010 the base station 105 may receive a second indication from the UE that indicates that the UE can viably connect the uplink for the second communication link. In some examples and with reference to FIG. 15, uplink component 1535 may receive an indication from the UE that indicates whether the UE can viably connect an uplink for the second communication link. Uplink component 1535 may monitor for HARQ acknowledgement from the UE for the set of downlink transmissions, where transmission to the UE over the downlink for the second communication link is suspended until the HARQ acknowledgement is received. Uplink component 1535 may receive a second indication from the UE that indicates that the UE can viably connect the uplink for the second communication link. The operations of block 2010 may be performed according to the methods described herein. In certain examples, aspects of the operations of block 2010 may be performed by an uplink component as described with reference to FIGS. 14 through 17.

At block 2015 the base station 105 may transmit a third downlink transmission over the second communication link. In some examples, downlink component 1540 may transmit a downlink transmission over the second communication link. Downlink component 1540 may transmit a set of downlink transmissions over the downlink for the second communication link, the set of downlink transmissions corresponding to the number of HARQ processes. Downlink component 1540 may transmit a third downlink transmission over the second communication link. In some cases, the downlink transmission is asynchronous to the preceding downlink transmission. The operations of block 2015 may be performed according to the methods described herein. In certain examples, aspects of the operations of block 2015 may be performed by a downlink component as described with reference to FIGS. 14 through 17.

At block 2020 the base station 105 may receive, from the UE, uplink control information for the third downlink transmission via the uplink for the second communication link. In some examples and with reference to FIG. 15, uplink control component 1545 may receive uplink control information for the downlink transmission over an uplink for the first communication link or the uplink for the second communication link based on the indication. Uplink control component 1545 may configure the UE with a number of HARQ processes for a downlink for the second communication link. Uplink control component 1545 may receive the uplink control information for the downlink transmission over the uplink for the first communication link. Uplink control component 1545 may receive, from the UE, uplink control information for the third downlink transmission via the uplink for the second communication link. The operations of block 2020 may be performed according to the methods described herein. In certain examples, aspects of the operations of block 2020 may be performed by a uplink control component as described with reference to FIGS. 14 through 17.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE) having a first radio supporting communications via a first frequency band and a second radio supporting communications via a second frequency band, comprising:
   receiving, via a first communication link in the first frequency band of a first cell, a configuration for a second communication link in the second frequency band of a second cell;
   determining whether an uplink for the second communication link can connect;
   activating the second radio based at least in part on the configuration;
   receiving, via the second radio, a downlink transmission over the second communication link; and
   transmitting uplink control information responsive to the downlink transmission over the first communication link or over the second communication link based at least in part on the determining whether the uplink for the second communication link can connect.

2. The method of claim 1, further comprising:
   receiving, via the first radio, a preceding downlink transmission over the first communication link; and
   identifying a timing offset between the preceding downlink transmission and the downlink transmission based at least in part on the configuration, wherein the activating the second radio for the downlink transmission is based at least in part on the timing offset.

3. The method of claim 1, wherein determining whether the uplink for the second communication link can connect comprises determining that the uplink for the second communication link cannot be establish a connection, the transmitting comprising:

transmitting, to a base station associated with the first communication link, the uplink control information for the downlink transmission over the first communication link.

4. The method of claim 1, wherein the downlink transmission starts prior to completion of a channel access procedure for a first frequency channel associated with a preceding downlink transmission.

5. The method of claim 1, further comprising:
receiving, via the first radio, a preceding downlink transmission over the first communication link,
wherein the preceding downlink transmission comprises downlink control information indicating resources of the downlink transmission associated with a transport block for the UE.

6. The method of claim 1, wherein the configuration comprises a set of hybrid automatic repeat request (HARQ) processes for the second communication link, the downlink transmission being associated with one of the set of HARQ processes.

7. The method of claim 1, wherein the determining whether the uplink for the second communication link can be connected is based at least in part on a link budget for the uplink for the second communication link, a power consumption cost for the UE of the uplink for the second communication link, a maximum permissible exposure (MPE) for the uplink for the second communication link, or any combination thereof.

8. The method of claim 1, wherein the determining whether the uplink for the second communication link can be connected comprises determining that the uplink for the second communication link can be connected, the transmitting comprising:
transmitting, via the second radio, the uplink control information for the downlink transmission over the uplink for the second communication link.

9. The method of claim 1, wherein the uplink control information comprises acknowledgement information, link management information, beam management information, or any combination thereof.

10. The method of claim 1, further comprising:
receiving, via the first radio, a preceding downlink transmission over the first communication link,
wherein the preceding downlink transmission and the downlink transmission are received from respective antenna arrays of a same base station.

11. The method of claim 1, further comprising:
receiving, via the first radio, a preceding downlink transmission over the first communication link,
wherein the preceding downlink transmission is received from a first base station and the downlink transmission is received from a second base station.

12. The method of claim 1, wherein the first communication link is established over a licensed channel in the first frequency band and the second communication link is established over an unlicensed frequency channel in the second frequency band or a shared-spectrum channel in the second frequency band.

13. The method of claim 1, further comprising:
receiving, from a base station, a resource reservation request (RRQ) over a first communication link, wherein the RRQ indicates reservation of a first frequency channel for use by the first communication link; and
transmitting, to the base station, a resource reservation response (RRS) over the first communication link, wherein the preceding downlink transmission is received from the base station based at least in part on the RRS, wherein the RRQ indicates a set of UEs to be scheduled on the second communication link, the set of UEs comprising the UE.

14. The method of claim 13, wherein the RRQ indicates a timing offset between the preceding downlink transmission and the downlink transmission, and wherein the activating the second radio for the downlink transmission is based at least in part on the timing offset.

15. The method of claim 13, wherein the RRS indicates whether the UE can connect the uplink for the second communication link.

16. A method for wireless communication, comprising:
determining, based at least in part on a first channel access procedure, that a first frequency channel in a first frequency band of a first cell is available for use by a first communication link to a user equipment (UE);
transmitting a preceding downlink transmission via the first communication link to the UE, the preceding downlink transmission activating a second communication link over a second frequency channel in a second frequency band of a second cell;
receiving an indication from the UE that indicates whether the UE can connect an uplink for the second communication link;
transmitting a downlink transmission over the second communication link; and
receiving uplink control information for the downlink transmission over an uplink for the first communication link or the uplink for the second communication link based at least in part on the indication.

17. The method of claim 16, further comprising:
identifying a timing offset between the preceding downlink transmission and the downlink transmission, wherein the downlink transmission is transmitted based at least in part on the timing offset.

18. The method of claim 17, further comprising:
determining that the second frequency channel is available based at least in part on a second channel access procedure for the second frequency channel at the timing offset.

19. The method of claim 16, wherein the downlink transmission is asynchronous to the preceding downlink transmission.

20. The method of claim 19, further comprising:
configuring the UE with a number of hybrid automatic repeat request (HARQ) processes for a downlink for the second communication link;
transmitting a plurality of downlink transmissions over the downlink for the second communication link, the plurality of downlink transmissions corresponding to the number of HARQ processes; and
monitoring for HARQ acknowledgement from the UE for the plurality of downlink transmissions, wherein transmission to the UE over the downlink for the second communication link is suspended until the HARQ acknowledgement is received.

21. The method of claim 16, further comprising:
transmitting, to the UE, a resource reservation request (RRQ) over the first communication link, wherein the RRQ indicates reservation of the first frequency channel by a base station; and
receiving, from the UE, a resource reservation response (RRS) over the first communication link, wherein the preceding downlink transmission is transmitted from the base station based at least in part on the RRS.

22. The method of claim 21, wherein the RRQ indicates a timing offset between the preceding downlink transmission and the downlink transmission.

23. The method of claim 21, wherein the RRS indicates whether the UE can connect the uplink for the second communication link.

24. The method of claim 16, wherein the first frequency channel comprises a licensed frequency channel and the second frequency channel comprises an unlicensed frequency channel or a shared-spectrum frequency channel.

25. The method of claim 16, wherein the indication indicates that the UE cannot connect the uplink for the second communication link, the method further comprising:
receiving the uplink control information for the downlink transmission over the uplink for the first communication link;
receiving a second indication from the UE that indicates that the UE can connect the uplink for the second communication link;
transmitting a third downlink transmission over the second communication link; and
receiving, from the UE, uplink control information for the third downlink transmission via the uplink for the second communication link.

26. An apparatus for wireless communication having a first radio supporting communications via a first frequency band and a second radio supporting communications via a second frequency band, the apparatus further comprising:
a processor;
memory in electronic communication with the processor; and
instructions stored in the memory and operable, when executed by the processor, to cause the apparatus to:
receive, via a first communication link in the first frequency band of a first cell, a configuration for a second communication link in the second frequency band of a second cell;
determine whether an uplink for the second communication link can be connected;
activate the second radio based at least in part on the configuration;
receive, via the second radio, a downlink transmission over the second communication link; and
transmit uplink control information for the downlink transmission over the first communication link or over the second communication link based at least in part on the determining whether the uplink for the second communication link can be connected.

27. The apparatus of claim 26, wherein the instructions are further executable by the processor to:
receive, via the first radio, a preceding downlink transmission over a first communication link;
identify a timing offset between the preceding downlink transmission and the downlink transmission based at least in part on the configuration, wherein the activating the second radio for the downlink transmission is based at least in part on the timing offset.

28. The apparatus of claim 26, wherein the instructions determine that the uplink for the second communication link cannot be connected, the instructions further executable by the processor to:
transmit, to a base station associated with the first communication link, the uplink control information for the downlink transmission over the first communication link.

29. An apparatus for wireless communication, comprising:
a processor;
memory in electronic communication with the processor; and
instructions stored in the memory and operable, when executed by the processor, to cause the apparatus to:
determine, based at least in part on a first channel access procedure, that a first frequency channel in a first frequency band of a first cell is available for use by a first communication link to a user equipment (UE);
transmit a preceding downlink transmission via the first communication link to the UE, the preceding downlink transmission activating a second communication link over a second frequency channel in a second frequency band of a second cell;
receive an indication from the UE that indicates whether the UE can connect an uplink for the second communication link;
transmit a downlink transmission over the second communication link; and
receive uplink control information for the downlink transmission over an uplink for the first communication link or the uplink for the second communication link based at least in part on the indication.

30. The apparatus of claim 29, wherein the instructions are further executable by the processor to:
identify a timing offset between the preceding downlink transmission and the downlink transmission, wherein the downlink transmission is transmitted based at least in part on the timing offset;
receiving, from a base station, a resource reservation request (RRQ) over the first communication link, wherein the RRQ indicates reservation of a first frequency channel for use by the first communication link; and
transmitting, to the base station, a resource reservation response (RRS) over the first communication link, wherein the preceding downlink transmission is received from the base station based at least in part on the RRS.

* * * * *